(12) United States Patent
Coban et al.

(10) Patent No.: US 9,215,473 B2
(45) Date of Patent: Dec. 15, 2015

(54) SUB-SLICES IN VIDEO CODING

(75) Inventors: Muhammed Zeyd Coban, Carlsbad, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 380 days.

(21) Appl. No.: 13/357,386

(22) Filed: Jan. 24, 2012

(65) Prior Publication Data

US 2012/0189049 A1   Jul. 26, 2012

Related U.S. Application Data

(60) Provisional application No. 61/436,560, filed on Jan. 26, 2011, provisional application No. 61/450,473, filed on Mar. 8, 2011.

(51) Int. Cl.
*H04N 19/436* (2014.01)
*H04N 19/196* (2014.01)
*H04N 19/70* (2014.01)
*H04N 19/13* (2014.01)
*H04N 19/96* (2014.01)
*H04N 19/174* (2014.01)

(52) U.S. Cl.
CPC ............ *H04N 19/436* (2014.11); *H04N 19/13* (2014.11); *H04N 19/174* (2014.11); *H04N 19/197* (2014.11); *H04N 19/70* (2014.11); *H04N 19/96* (2014.11)

(58) Field of Classification Search
CPC .............. H04N 19/00375; H04N 19/00278; H04N 19/00369; H04N 19/00781; H04N 19/00545; H04N 19/197

USPC ........................................ 375/240.02, 240
See application file for complete search history.

(56) References Cited

U.S. PATENT DOCUMENTS 5,471,248 A   11/1995  Bhargava et al.
5,532,744 A   7/1996   Akiwumi-Assani et al.
5,557,332 A   9/1996   Koyanagi et al.
(Continued)

FOREIGN PATENT DOCUMENTS

EP   2216994 A2    8/2010
JP   2010183305 A  8/2010
(Continued)

OTHER PUBLICATIONS

Marpe et al. (Video Compression Using Nested Quadtree Structures, Leaf Merging, and Improved Techniques for Motion Representation and Entropy Coding, IEEE Transactions on Circuits and Systems for Video Technology, vol. 20, No. 12, Dec. 2010).*
(Continued)

*Primary Examiner* — Dave Czekaj
*Assistant Examiner* — Berteau Joisil
(74) *Attorney, Agent, or Firm* — Shumaker & Sieffert, P.A.

(57) ABSTRACT

A video encoder partitions a slice of a picture into a plurality of sub-slices. When the video encoder encodes the slice, the video encoder generates a coded slice that includes coded sub-slices that correspond to the sub-slices. Each of the sub-slices can be parsed independently of each other one of the sub-slices and can be reconstructed independently of each other one of the sub-slices. Accordingly, a video decoder may parse two or more of the sub-slices in parallel and decode two or more of the sub-slices in parallel.

48 Claims, 6 Drawing Sheets

(56) References Cited

U.S. PATENT DOCUMENTS

| | | | |
|---|---|---|---|
| 6,919,826 | B1 | 7/2005 | Peacock |
| 7,375,661 | B2 | 5/2008 | Chiba et al. |
| 7,595,743 | B1 | 9/2009 | Winger et al. |
| 7,782,943 | B2 | 8/2010 | Jeon et al. |
| 2007/0177672 | A1* | 8/2007 | Yang .................. 375/240.25 |
| 2008/0013620 | A1 | 1/2008 | Hannuksela et al. |
| 2008/0013622 | A1 | 1/2008 | Bao et al. |
| 2008/0253461 | A1 | 10/2008 | Lin et al. |
| 2009/0002379 | A1 | 1/2009 | Baeza et al. |
| 2009/0245349 | A1 | 10/2009 | Zhao et al. |
| 2009/0245661 | A1 | 10/2009 | Ilbery |
| 2010/0046635 | A1 | 2/2010 | Pandit et al. |
| 2010/0098157 | A1 | 4/2010 | Yang |
| 2010/0111183 | A1 | 5/2010 | Jeon et al. |
| 2011/0055661 | A1* | 3/2011 | Grube et al. .................. 714/763 |
| 2011/0110436 | A1 | 5/2011 | Schierl et al. |
| 2012/0075436 | A1 | 3/2012 | Chen et al. |
| 2012/0082218 | A1 | 4/2012 | Misra et al. |
| 2012/0163452 | A1 | 6/2012 | Horowitz |
| 2012/0166582 | A1* | 6/2012 | Binder ........................... 709/217 |
| 2012/0230428 | A1 | 9/2012 | Segall et al. |
| 2013/0114735 | A1 | 5/2013 | Wang |
| 2013/0114736 | A1 | 5/2013 | Wang et al. |

FOREIGN PATENT DOCUMENTS

| | | | |
|---|---|---|---|
| WO | WO2009119888 | A1 | 10/2009 |
| WO | 2010050157 | A1 | 5/2010 |
| WO | 2011048303 | A1 | 4/2011 |

OTHER PUBLICATIONS

Bross, B. et al., "WD4: Working Draft 4 of High-Efficiency Video Coding," Joint Collaborative Team on Video Coding, Document: JCTVC-F803, Jul. 14-22, 2011, 222 pp.
Clare, G. et al., "Wavefront and Cabac Flush: Different Degrees of Parallelism Without Transcoding," Joint Collaborative Team on Video Coding, Document: JCTVC-F275, Jul. 14-22, 2011, 11 pp.
Clare, G. et al., "Wavefront Parallel Processing for HEVC Encoding and Decoding," Joint Collaborative Team on Video Coding, Document: JCTVC-F274, Jul. 14-22, 2011, 16 pp.
Coban, M. et al., "Evaluation of Entropy Slices," Joint Collaborative Team on Video Coding, Document: JCTVC-D430, Jan. 20-28, 2011, 3 pp.
Fuldseth, A. et al., "Tiles," Joint Collaborative Team on Video Coding, Document: JCTVC-F335, Jul. 14-22, 2011, 15 pp.
Hang, H.M. et al., "Towards the Next Video Standard: High Efficiency Video Coding," Proceedings of the Second APSIPA Annual Summit and Conference, Dec. 17, 2010, 10 pp.
Misra, K. et al., "New results for parallel decoding for Tiles," Joint Collaborative Team on Video Coding, Document: JCTVC-F594, Jul. 14-22, 2011, 6 pp.
Misra, K. et al., "Entropy Slices for Parallel Entropy Coding," Joint Collaborative Team on Video Coding, PowerPoint: JCTVC-B111, Jul. 21-28, 2010, 10 pp.
Misra, K. et al., "Entropy Slices for Parallel Entropy Coding," Joint Collaborative Team on Video Coding, Document: JCTVC-B111, Jul. 21-28, 2010, 6 pages.
Wenger, S. et al., "Adaptation Parameter Set (APS)," Joint Collaborative Team on Video Coding, Document: JCTVC-F747r3, Jul. 14-22, 2011, 10 pages.
Anonymous, "Test Model under Consideration", Joint Collaborative Team on Video Coding, JCTVC-B205, Jul. 21-28, 2010, 152 pp.
Fuldseth, "Replacing slices with tiles for high level parallelism", Joint Collaborative Team on Video Coding, JCTVC-D227, Jan. 20-28, 2011, 4 pp.
Horowitz et al., "Generalized slices", Joint Collaborative Team on Video Coding, JCTVC-D378, Jan. 20-28, 2011, 7 pp.
Hsu et al., "Syntax for Leaf Coding Unit Aligned Slices", Joint Collaborative Team on Video Coding, JCTVC-D127, Jan. 20-28, 2011, 13 pp.

International Search Report and Written Opinion—PCT/US2012/022591—ISA/EPO—Mar. 20, 2012—18 pp.
Misra et al., "Lightweight slicing for entropy coding", Joint Collaborative Team on Video Coding, JCTVC-D070, Jan. 20-28, 2011, 7 pp.
Lambert et al., "Flexible macroblock ordering in H.264/AVC", Journal of Visual Communication and Image Representation, Elsevier Inc., Aug. 11, 2005, 18 pp.
Misra et al., "Entropy Slices for Parallel Entropy Coding", Joint Collaborative Team on Video Coding, JCTVC-C256, Oct. 7-15, 2010, 6 pp.
Nael et al., "Slices modifications for HEVC", Joint Collaborative Team on Video Coding, JCTVCC-E222, Mar. 16-23, 2011, 8 pp.
Wiegand et al., "Overview of the H.264/AVC video coding standard", IEEE Transactions on Circuits and Systems for Video Technology, vol. 13, No. 7, Jul. 2003, 17 pp.
Bross B., et al., "WD4: Working Draft 4 of High-Efficiency Video Coding", 6. JCT-VC Meeting; 97. MPEG Meeting; Jul. 14, 2011-Jul. 22, 2011; Torino; (Joint Collaborative Team on Video Coding of ISO/IEC JTC1/SC29/WG11 and ITU-T SG.16); URL: http://wftp3.itu.int/av-arch/jctvc-site/, No. JCTVC-F803, Sep. 8, 2011, 226 pp.
Bross, et al., "WD5: Working Draft 5 of High-Efficiency Video Coding," JCTVC-G1103_d2, (JCT-VC) of ITU-T SG16 WP3 and ISO/IEC JTC1/SC29/WG11 Joint Collaborative Team on Video Coding, 7th Meeting, Geneva, Switzerland (Nov. 2011), 214 pages.
Chen Y., et al.,"AHG 17: Unified NAL unit header design for HEVC and its extensions", 7. JCT-VC Meeting; 98. MPEG Meeting; Nov. 21, 2011-Nov. 30, 2011; Geneva; (Joint Collaborative Team on Video Coding of ISO/IEC JTC1/SC29/WG11 and ITU-TSG. 16 ); URL: http:// wftp3.itu.int/av-arch/jctvc-site/,, No. JCTVC-G336, Nov. 9, 2011, 8 pp.
Clare et al., "Wavefront and Cabac Flush: Different Degrees of Parallelism Without Transcoding," Joint Collaborative Team on Video Coding, JCTVC-F275 PowerPoint, Jul. 14-22, 2011, 12 slides.
Coban M. et al., "AHG4: Unification of picture partitioning schemes", 7. JCT-VC Meeting; 98. MPEG Meeting; Nov. 21, 2011-Nov. 30, 2011; Geneva; (Joint Collaborative Team on Video Coding of ISO/IEC JTC1/SC29/ WG11 and ITU-T SG.16); URL: http://wftp3.itu.int/av-arch/jctvc-site/,, No. JCTVC-G315, Nov. 9, 2011, 11 pp.
Fuldseth et al., "Tiles," Joint Collaborative Team on Video Coding, JCTVC-F335 PowerPoint, Jul. 14-22, 2011, 12 slides.
Horowitz (Ebrisk) M: "JCT-VC BoG report: tiles and wavefront parallel processing" , 7. JCT-VC Meeting; 98. MPEG Meeting; Nov. 21, 2011-Nov. 30, 2011; Geneva; (Joint Collaborative Team on Video Coding of ISO/IEC JTC1/SC29/WG11 and ITU-T SG.16 ); URL: http://wftp3.itu.int/av-arch/jctvc-site/,, No. JCTVC-G1025, Nov. 26, 2011, 8 pp.
International Preliminary Report on Patentability from international application No. PCT/US2012/022591, dated Apr. 17, 2013, 27 pp.
ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.
McCann K. et al.,"HM4: HEVC Test Model 4 Encoder Description", 97. MPEG Meeting; Jul. 18, 2011-Jul. 22, 2011; Torino; (Motion Picture Expert Group or ISO/IEC JTC1/SC29/WG11) No. N21450, Jul. 22, 2011, 36 pp.
Misra et al., "New results for parallel decoding for Tiles," Joint Collaborative Team on Video Coding, JCTVC-F594 PowerPoint, Jul. 14-22, 2011, 10 slides.
Stockhammer Thomas et al., "Comments on H.26 NAL design", 12. VCEG Meeting; Sep. 1, 2001-Dec. 1, 2001; EIBSEE, DE; (Video Coding Experts Group of I TU-T SG . 16), No. VCEG-L26, Jan. 4, 2001, 4 pp.
Wang, Y-K, et al., "Flexible tile dependency and loop filtering control," Document JCTVC-G0520, Joint Collaborative Team on Video Coding (JCT-VC) of ITU-T SG16 WP3 and ISO/IEC JTC1/SC29/WG11, 8th Meeting: San Jose, CA , USA, Feb. 1-10, 2012, pp. 1-7.
Wang, Y-K, et al., "Flexible tile dependency and loop filtering control", Document JCTVC-H0521r1, Joint Collaborative Team on Video Coding (JCT-VC) of ITU-T SG16 WP3 and ISO/IEC JTC1/SC29/WG11, 8th Meeting: San Jose, CA, USA, Feb. 1-10, 2012, pp. 1-7.

(56) References Cited

OTHER PUBLICATIONS

Wenger et al., "High level syntax for loop filter parameters," Joint Collaborative Team on Video Coding, JCTVC-F747 PowerPoint, Jul. 14-22, 2011, 7 slides.

Wiegand, T., et al., "WD2: Working Draft 2 of High-Efficiency Video Coding", Jan. 28, 2011, No. JCTVC-D503, Jan. 28, 2011, XP002679642, Retrieved from the Internet: URL: http://wftp3.itu.int/av-arch/jctvc-site/2011_01_D_Daegu/ [retrieved on Jul. 11, 2012], 153 pp.

Wiegand, T., et al., "WD3: Working Draft 3 of High-Efficiency Video Coding," Document JCTVC-E603, 5th Meeting: Geneva, CH, Mar. 16-23, 2011, 193 pp.

Wiegand, T., et al.,"WD1: Working Draft 1 of High-Efficiency Video Coding", JCTVC-C403, Joint Collaborative Team on Video Coding (JCT-VC), of ITU-T SG16 WP3 and ISO/IEC JTC1/SC29/WG11, 3rd Meeting: Guangzhou, CN, Oct. 7-15, 2010, 137 pp.

Second Written Opinion of international application No. PCT/US2012/022591, dated Jan. 17, 2013, 9 pp.

Bross et al., "High efficiency video coding (HEVC) text specification draft 9," 11th Meeting: Shanghai, CN, Oct. 10-19, 2012, JCTVC-K1003_v7, 290 pp.

Bross et al., "High efficiency video coding (HEVC) text specification draft 10 (for FDIS & Last Call)," 12th Meeting: Geneva, CH, Jan. 14-23, 2013, JCTVC-L1003_v34, 310 pp.

International Preliminary Report on Patentability from International Application No. PCTUS2012022591, dated Apr. 17, 2013, 27 pp.

ITU-T H.265, Series H: Audiovisual and Multimedia Systems, Infrastructure of audiovisual services—Coding of moving video, Advanced video coding for generic audiovisual services, The International Telecommunication Union. Apr. 2013, 317 pp.

Bross et al., "WD4: Working Draft 4 of High-Efficiency Video Coding," 6th Meeting: JCTVC-F803_d6, Torino, IT, Nov. 20, 2011, 229 pp.

ITU-T H.265, Series H: Audiovisual and Multimedia Systems, Infrastructure of audiovisual services—Coding of moving video, Advanced video coding for generic audiovisual services, The International Telecommunication Union, Oct. 2014, 540 pp.

\* cited by examiner

SUB-SLICES IN VIDEO CODING

CROSS REFERENCE TO RELATED APPLICATIONS

This application claims the benefit of U.S. Provisional Application No. 61/436,560, filed Jan. 26, 2011, and U.S. Provisional Application No. 61/450,473, filed Mar. 8, 2011, the entire content of which is hereby incorporated by reference.

TECHNICAL FIELD

This disclosure relates to techniques for encoding and decoding video data.

BACKGROUND

Digital video capabilities may be incorporated into a wide range of devices, including digital televisions, digital direct broadcast systems, wireless broadcast systems, personal digital assistants (PDAs), laptop or desktop computers, digital cameras, digital recording devices, digital media players, video gaming devices, video game consoles, cellular or satellite radio telephones, video teleconferencing devices, and the like. Digital video devices implement video compression techniques, such as those described in the standards defined by MPEG-2, MPEG-4, ITU-T H.263 or ITU-T H.264/MPEG-4, Part 10, Advanced Video Coding (AVC), and extensions of such standards, to transmit and receive digital video information more efficiently.

Video compression techniques perform spatial prediction and/or temporal prediction to reduce or remove redundancy inherent in video sequences. For block-based video coding, a video frame or slice may be partitioned into blocks. Each block may be further partitioned. Blocks in an intra-coded (I) frame or slice are encoded using spatial prediction with respect to neighboring blocks. Blocks in an inter-coded (P or B) frame or slice may use spatial prediction with respect to neighboring blocks in the same frame or slice or temporal prediction with respect to other reference frames.

SUMMARY

The techniques of this disclosure generally relate to encoding and decoding video data. More specifically, a video encoder partitions a slice of a picture into a plurality of sub-slices. Furthermore, the video encoder generates a coded slice. The coded slice includes coded sub-slices that correspond to the sub-slices. Each of the sub-slices can be parsed independently of each other one of the sub-slices and can be reconstructed independently of each other one of the sub-slices. Accordingly, a video decoder may parse two or more of the sub-slices in parallel and decode two or more of the sub-slices in parallel. The use of sub-slices may enable more partitions of pictures that can be independently parsed and reconstructed with fewer bits than an equivalent number of slices.

In one example, this disclosure describes a method for encoding video data. The method comprises encoding a slice of a picture in the video data to form a coded slice. The slice is partitioned into a plurality of sub-slices. The coded slice includes coded sub-slices that correspond to the sub-slices. Each of the sub-slices can be parsed independently of each other one of the sub-slices and each of the sub-slices can be reconstructed independently of each other one of the sub-slices. The method also comprises generating information to signal positions of the coded sub-slices within the coded slice.

In another example, this disclosure describes a method of decoding video data. The method comprises receiving a coded slice. The coded slice is an encoded form of a slice of a picture in the video data. The slice includes a first sub-slice and a second sub-slice. The coded slice comprises a first coded sub-slice and a second coded sub-slice that correspond to the first sub-slice and the second sub-slice respectively. The first and second coded sub-slices are encoded such that the first and second sub-slices can be parsed independently of each other and can be reconstructed independently of each other. The method also comprises parsing the first and second sub-slices in parallel. Furthermore, the method comprises, after parsing the first and second sub-slices, reconstructing the first and second sub-slices in parallel.

In another example, this disclosure describes a video encoding apparatus that comprises one or more processors that are configured to encode a slice of a picture in the video data to form a coded slice. The slice is partitioned into a plurality of sub-slices. The coded slice includes coded sub-slices that correspond to the sub-slices. Each of the sub-slices can be parsed independently of each other one of the sub-slices and each of the sub-slices can be reconstructed independently of each other one of the sub-slices. The one or more processors are also configured to generate information to signal positions of the coded sub-slices within the coded slice.

In another example, this disclosure describes a video decoding apparatus comprising one or more processors configured to receive a coded slice. The coded slice is an encoded form of a slice of a picture in the video data. The slice includes a first sub-slice and a second sub-slice. The coded slice comprises a first coded sub-slice and a second coded sub-slice that correspond to the first sub-slice and the second sub-slice respectively. The first and second coded sub-slices are encoded such that the first and second sub-slices can be parsed independently of each other and can be reconstructed independently of each other. The one or more processors are also configured to parse the first and second sub-slices in parallel. In addition, the one or more processors are configured to decode, after parsing the first and second sub-slices, the first and second sub-slices in parallel.

In another example, this disclosure describes a video encoding apparatus comprising means for encoding a slice of a picture in the video data to form a coded slice. The slice is partitioned into a plurality of sub-slices. The coded slice includes coded sub-slices that correspond to the sub-slices. Each of the sub-slices can be parsed independently of each other one of the sub-slices and each of the sub-slices can be reconstructed independently of each other one of the sub-slices. The video encoding apparatus also comprises means for generating information to signal positions of the coded sub-slices within the coded slice.

In another example, this disclosure describes a video decoding apparatus comprising means for receiving a coded slice. The coded slice is an encoded form of a slice of a picture in the video data. The slice includes a first sub-slice and a second sub-slice. The coded slice comprises a first coded sub-slice and a second coded sub-slice that correspond to the first sub-slice and the second sub-slice respectively. The first and second coded sub-slices are encoded such that the first and second sub-slices can be parsed independently of each other and can be reconstructed independently of each other. The video decoding apparatus also comprises means for parsing the first and second sub-slices in parallel. In addition, the video decoding apparatus comprises means for reconstructing, after parsing the first and second sub-slices, the first and second sub-slices in parallel.

In another example, this disclosure describes a computer program product that comprises one or more computer storage media that store computer-executable instructions that configure one or more processors to encode a slice of a picture in the video data to form a coded slice. The slice is partitioned into a plurality of sub-slices. The coded slice includes coded sub-slices that correspond to the sub-slices. Each of the sub-slices can be parsed independently of each other one of the sub-slices and each of the sub-slices can be reconstructed independently of each other one of the sub-slices. The computer-executable instructions also configure the one or more processors to generate information to signal positions of the coded sub-slices within the coded slice.

In another example, this disclosure describes a computer program product that comprises one or more computer storage media that store computer-executable instructions that configure one or more processors to receive a coded slice. The coded slice is an encoded form of a slice of a picture in the video data. The slice includes a first sub-slice and a second sub-slice. The coded slice comprises a first coded sub-slice and a second coded sub-slice that correspond to the first sub-slice and the second sub-slice respectively. The first and second coded sub-slices are encoded such that the first and second sub-slices can be parsed independently of each other and can be reconstructed independently of each other. The computer-executable instructions also configure one or more processors to parse the first and second sub-slices in parallel. The computer-executable instructions also configure one or more processors to reconstruct, after parsing the first and second sub-slices, the first and second sub-slices in parallel.

The details of one or more aspects of the disclosure are set forth in the accompanying drawings and the description below. Other features, objects, and advantages of the techniques described in this disclosure will be apparent from the description and drawings, and from the claims.

DETAILED DESCRIPTION

The attached drawings illustrate examples. Elements indicated by reference numbers in the attached drawings correspond to elements indicated by like reference numbers in the following description. In this disclosure, elements having names that start with ordinal words (e.g., "first," "second," "third," and so on) do not necessarily imply that the elements have a particular order. Rather, such ordinal words are merely used to refer to different elements of a same or similar type.

The techniques of this disclosure generally relate to encoding and decoding video data. More specifically, a video encoder partitions a picture into one or more slices, and partitions one or more slices into a plurality of sub-slices. Furthermore, the video encoder encodes the slice to form a coded slice. As part of generating the coded slice, the video encoder encodes the sub-slices to generate coded sub-slices. Each of the sub-slices can be parsed independently of each other one of the sub-slices and can be reconstructed independently of each other one of the sub-slices. The use of sub-slices may enable more partitions of a picture that can be independently parsed and reconstructed with fewer bits than an equivalent number of slices.

The video encoder may output a bitstream that includes the coded slice. Because the sub-slices can be parsed independently, a video decoder may parse two or more of the sub-slices in parallel. When the video decoder parses a sub-slice, the video encoder may extract syntax elements associated with the sub-slice from the bitstream. In some instances, parsing the sub-slice may involve performing one or more entropy decoding operations. The video decoder may parse a first sub-slice independently of a second sub-slice if the video decoder is able to extract the syntax elements associated with the first sub-slice without using data obtained by extracting the syntax elements associated with the second sub-slice, and vice versa.

Because the sub-slices can be reconstructed independently, the video decoder may reconstruct the sub-slices in parallel. When the video decoder reconstructs a sub-slice, the video decoder may use the syntax elements associated with the sub-slice to determine pixel values of the sub-slice. A first sub-slice may be reconstructed independently of a second sub-slice if the video decoder is able to reconstruct the first sub-slice without using data obtained by reconstructing the second sub-slice, and vice versa. As one example, a video decoder is configured to intra-decode blocks within each sub-slice independently of other sub-slices, i.e., without using information from blocks in other sub-slices for intra-prediction decoding and reconstruction.

Figure 1:
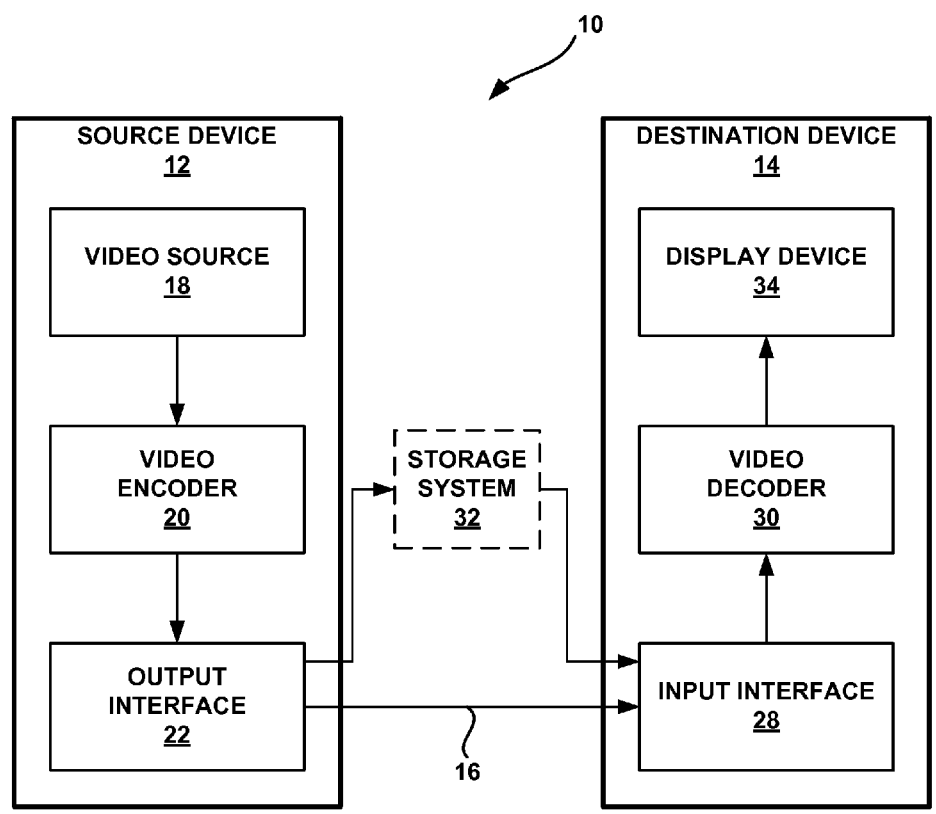
FIG. 1 is a block diagram that illustrates an example video coding system.

FIG. 1 is a block diagram that illustrates an example video coding system 10 that may utilize the techniques described in this disclosure. In this disclosure, the term "video coding" may refer to video encoding and video decoding. As shown in FIG. 1, video coding system 10 includes a source device 12 and a destination device 14. Source device 12 generates encoded video data. Thus, source device 12 may be a video encoding apparatus. Destination device 14 may decode the encoded video data at a later time. Thus, destination device 14 may be a video decoding apparatus. Source device 12 and destination device 14 may comprise any of a wide range of devices or apparatuses, including desktop computers, notebook (i.e., laptop) computers, server computers, rack-mounted computers, tablet computers, set-top boxes, mobile telephones, telephone handsets, televisions, cameras, display devices, digital media players, video gaming consoles, video streaming devices, in-car computers, or types of computing devices capable of encoding and/or decoding video data.

Destination device 14 may receive the encoded video data via a communication channel 16. Communication channel 16 may comprise a medium or device capable of moving the encoded video data from source device 12 to destination device 14. In one example, communication channel 16 may comprise a communication medium that enables source device 12 to transmit encoded video data directly to destination device 14 in real-time. Source device 12 or another device may modulate the encoded video data according to a communication standard, such as a wireless communication protocol. The communication medium may comprise any wireless or wired communication medium, such as a radio frequency (RF) spectrum or one or more physical transmission lines. Communication channel 16 may form part of a packet-based network, such as a local area network, a wide-area network, or a global network such as the Internet. Communication channel 16 may include routers, switches, base stations, or any other equipment that may be useful to facilitate communication of the encoded video data from source device 12 to destination device 14.

In some examples, source device 12 and destination device 14 may be equipped for wireless communication. However, the techniques of this disclosure are not necessarily limited to wireless applications or settings. Rather, the techniques may be applied to video coding in support of any of a variety of multimedia applications, such as over-the-air television broadcasts, cable television transmissions, satellite television transmissions, streaming video transmissions, e.g., via the Internet, encoding of digital video for storage on a data storage medium, decoding of digital video stored on a data storage medium, or other applications. In some examples, source device 12 and destination device 14 may be configured to support one-way or two-way video transmission to support applications such as video streaming, video playback, video broadcasting, and/or video telephony.

Furthermore, in some examples, source device 12 may output the encoded video data to a storage system 32. Similarly, destination device 14 may access encoded video data stored on storage system 32. In various examples, storage system 32 may include various distributed or locally accessed data storage media. Example types of data storage media include, but are not limited to, hard drives, Blu-ray discs, DVDs, CD-ROMs, solid state memory units, volatile or non-volatile memory, or other digital storage media suitable for storing encoded video data.

In some examples, storage system 32 may comprise a file server or another intermediate storage device that may hold the encoded video generated by source device 12. Destination device 14 may access stored video data from storage system 32 via streaming or download. The file server may be any type of server capable of storing encoded video data and transmitting that encoded video data to destination device 14. Example file servers include a web server (e.g., for a website), a file transfer protocol (FTP) server, network attached storage (NAS) devices, or a local disk drive. Destination device 14 may access the encoded video data through any standard data connection, including an Internet connection. This may include a wireless channel (e.g., a Wi-Fi connection), a wired connection (e.g., a digital subscriber line (DSL), optical fiber, coaxial cable, etc.), or a combination of both that is suitable for accessing encoded video data stored on a file server. The transmission of encoded video data from storage system 32 may be a streaming transmission, a download transmission, or a combination of both.

In the example of FIG. 1, source device 12 includes a video source 18, a video encoder 20 and an output interface 22. In some examples, output interface 22 may also include a modulator/demodulator (modem) and/or a transmitter. Video source 18 provides video data to video encoder 20. In various examples, video source 18 may comprise various types of devices and/or systems for providing video data. For example, video source 18 may comprise a video capture device, such as a video camera. In another example, video source 18 may comprise a video archive that contains previously captured video. In yet another example, video source 18 may comprise a video feed interface that receives video from a video content provider. In yet another example, video source 18 may comprise a computer graphics system for generating computer graphics data.

As described in detail below, video encoder 20 may encode the video data provided by video source 18. In some examples, source device 12 may transmit the encoded video data directly to destination device 14 via output interface 22. Moreover, in some examples, storage system 32 may store the encoded video data for later access by destination device 14 or other devices.

This disclosure may generally refer to video encoder 20 "signaling" certain information to another device, such as video decoder 30. It should be understood, however, that video encoder 20 may signal information by associating certain syntax elements with various encoded portions of video data. A syntax element may be an element of data in a bitstream. That is, video encoder 20 may "signal" data by storing certain syntax elements to various encoded portions of video data. In some cases, such syntax elements may be encoded and stored (e.g., stored to storage system 32) prior to being received and decoded by video decoder 30. Thus, the term "signaling" may generally refer to the communication of syntax or other data used to decode the compressed video data. Such communication may occur in real- or near-real-time. Alternately, such communication may occur over a span of time, such as might occur when storing syntax elements to a medium at the time of encoding, which video decoder 30 may then retrieve at a time after being stored to this medium.

In the example of FIG. 1, destination device 14 includes an input interface 28, a video decoder 30, and a display device 34. In some examples, input interface 28 may include a receiver and/or a modem. Input interface 28 of destination device 14 receives encoded video data from communication channel 16 and/or storage system 32. Video decoder 30 decodes the encoded video data received by input interface 28. Destination device 14 may render the decoded video data for display on display device 34.

Display device 34 may be integrated with or may be external to destination device 14. In some examples, destination device 14 may include an integrated display device and may also be configured to interface with an external display device. In various examples, display device 34 may comprise various types of display devices. For example, display device 34 may comprise a liquid crystal display (LCD), a plasma display, an organic light emitting diode (OLED) display, or another type of display device.

Although not shown in FIG. 1, video encoder 20 and video decoder 30 may be integrated with an audio encoder and decoder, and may include appropriate MUX-DEMUX units, or other hardware and software, to handle encoding of both audio and video in a common data stream or separate data streams. If applicable, in some examples, MUX-DEMUX units may conform to the ITU H.223 multiplexer protocol, or other protocols such as the user datagram protocol (UDP).

Video encoder 20 and video decoder 30 each may be implemented as any of a variety of suitable circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device.

Video encoder 20 and video decoder 30 may operate according to a video compression standard, such as the High Efficiency Video Coding (HEVC) standard presently under development, and may conform to the HEVC Test Model (HM). Alternatively, video encoder 20 and video decoder 30 may operate according to other proprietary or industry standards, such as the ITU-T H.264 standard, alternatively referred to as MPEG-4, Part 10, Advanced Video Coding (AVC), or extensions of such standards. Example extensions to standards include the scalable video coding (SVC) and Multiview Video Coding (MVC) extensions to the H.264/AVC standard. Other examples of video compression standards include MPEG-2 and ITU-T H.263. The techniques of this disclosure are not limited to any particular coding standard.

As mentioned briefly above, video encoder 20 encodes video data. The video data may comprise one or more sequences of pictures. Each of the pictures is a still image forming part of a video. In some instances, a picture may be referred to as a video "frame." When video encoder 20 encodes the video data, video encoder 20 may generate a bitstream. The bitstream includes a sequence of bits that form a representation of coded pictures and associated data. A coded picture is a coded representation of a picture.

To generate the bitstream, video encoder 20 may perform encoding operations for sequences of pictures in the video data. When video encoder 20 performs an encoding operation for a sequence of pictures, video encoder 20 may generate a series of coded pictures and associated data. In addition, video encoder 20 may generate a sequence parameter set that contains parameters applicable to the sequence of pictures. Furthermore, video encoder 20 may generate picture parameter sets (PPSs) that contain parameters applicable to the pictures as a whole.

To generate a coded picture, video encoder 20 may partition a picture into one or more treeblocks. A treeblock is a two-dimensional (2D) block of video data. In some instances, a treeblock may also be referred to as a largest coding unit (LCU). The treeblocks of HEVC may be broadly analogous to the macroblocks of previous standards, such as H.264/AVC. However, a treeblock is not necessarily limited to a particular size and may include one or more coding units (CUs). Video encoder 20 may use quadtree partitioning to partition each treeblock into one or more CUs, hence the name "treeblocks." As described below, video encoder 20 may use intra prediction or inter prediction to encode the non-partitioned CUs of treeblocks. A coded CU is a CU in the CU's encoded form.

In some examples, video encoder 20 may partition a picture into a plurality of slices. Each of the slices may include an integer number of CUs. In some instances, a slice comprises an integer number of treeblocks. In other instances, a boundary of a slice may be within a treeblock. In some examples, video encoder 20 may determine slice boundaries based on the size in bytes of the slices or according to the number of treeblocks in the slices.

As part of performing an encoding operation for a picture, video encoder 20 may perform encoding operations for each slice of the picture. The encoding operation for a slice may generate encoded data associated with the slice. The encoded data associated with the slice may be referred to as a "coded slice." The coded slice may include a slice header and slice data. The slice header may contain syntax elements pertaining to the slice. In accordance with examples of this disclosure, the slice data may include a series of coded sub-slices. When a coded slice includes one or more coded sub-slices, the slice header of the coded slice may include a flag that indicates that there are one or more coded sub-slices in the slice data of the coded slice.

As part of performing an encoding operation for a slice, video encoder 20 may partition the slice into a plurality of sub-slices. In other words, video encoder 20 may divide the CUs of the slice among the sub-slices of the slice. No two sub-slices of the slice include the same CU. Hence, a given CU may be entirely contained within a single sub-slice. Also, a single sub-slice may include multiple CUs. In some examples, a sub-slice may include a plurality of contiguous CUs arranged adjacent one another within a picture. Video encoder 20 may perform encoding operations on the sub-slices to generate encoded data associated with each of the sub-slices. The encoded data associated with a sub-slice may be referred to in this disclosure as a "coded sub-slice."

A coded sub-slice may include a sub-slice header and sub-slice data. The sub-slice header may contain syntax elements pertaining to the sub-slice. For example, a sub-slice header may identify a first CU of the corresponding sub-slice in order to specify which of the CUs of a picture are associated with the corresponding sub-slice. In some examples, the sub-slice header may specify the size of the coded sub-slice or the starting address of a next coded sub-slice. In another example, a sub-slice header may include a Context-Adaptive Binary Arithmetic Coding (CABAC) initialization state code (cabac_init_idc). The CABAC initialization state code may initialize the sub-slice entropy coding to a state of a previous sub-slice or a unique state, e.g., for the first coding unit in a slice. In this example, if the sub-slice header does not include a CABAC initialization start code, the sub-slice may inherit the CABAC initialization start code from the corresponding slice header. In another example, the sub-slice header may include a quantization parameter (QP) or a delta QP value for the sub-slice. In this example, if the sub-slice header does not include a QP or a delta QP value, the sub-slice may inherit the QP or the delta QP value specified by the corresponding slice header. The sub-slice header may specify either, both, or neither of the CABAC initialization start code and the QP or delta QP value. In other examples, the sub-slice header may include other information useful in processing and/or decoding the sub-slice. The sub-slice header may specify the first CU in the sub-slice in order to specify which CUs from the picture are associated with the sub-slice. In some examples, the sub-slice header may specify only information necessary to identify the position of the sub-slice within the regular slice. The sub-slice data may include one or more coded treeblocks. Video encoder 20 may perform one or more entropy encoding operations on data in the coded sub-slices.

As described in detail below, video encoder 20 may perform the encoding operations on sub-slices such that each sub-slice can be parsed independently and decoded independently. For example, blocks in each sub-slice can be reconstructed independently of information from other sub-slices. Because the sub-slices can be parsed independently, video decoder 30 may parse a sub-slice without using data obtained by parsing any of the other sub-slices. Because the sub-slices can be reconstructed independently, e.g., by intra-decoding with information from the same sub-slice and without information from other sub-slices, video decoder 30 may reconstruct a sub-slice without using data obtained by reconstructing any of the other sub-slices.

Video encoder 20 may generate information to signal positions of the coded sub-slices within a coded slice. As a result, video decoder 30 may be able to parse the sub-slices in parallel and reconstruct the sub-slices in parallel. Parsing the sub-slices in parallel and reconstructing the sub-slices in parallel may decrease the amount of time required to parse the sub-slices and reconstruct the sub-slices, and may permit use of parallel computing resources.

The bitstream generated by video encoder 20 includes a series of Network Abstraction Layer (NAL) units. Each of the NAL units may be a syntax structure containing an indication of a type of data in the NAL unit and bytes containing the data. For example, a NAL unit may contain data representing a sequence parameter set, a picture parameter set, a coded slice, supplemental enhancement information (SEI), an access unit delimiter, filler data, or another type of data. This disclosure may refer to a NAL unit that contains a coded slice as a coded slice NAL unit.

Each coded slice NAL unit in the bitstream contains a coded slice. A coded slice includes a coded slice header and slice data. The slice data may include coded sub-slices. Each of the coded sub-slices may include a coded sub-slice header and sub-slice data. The sub-slice data may include coded treeblocks. The coded treeblocks may include one or more coded CUs.

Thus, a coded slice may be arranged as follows:

|sliceHeader|SS_header_0|SS_data_0|SS_header_1|SS_data_1|...|sliceHeader....

In the above example, sliceHeader refers to the regular slice header. Within the coded slice, each sub-slice (SS) may include a sub-slice header (SS_header) including information on the size of the respective sub-slice, or the starting address of the next sub-slice in the regular slice. As shown above, each regular slice may include multiple sub-slices 0, 1, ... n, and include for each sub-slice a sub-slice header (e.g., SS_header_0, SS_header_1, ... SS_header_n) and sub-slice data (e.g., SS_data_0, SS_data_1, ... SS_data_n).

This sub-slice header information may enable a decoder to locate the position of each sub-slice within a regular slice for parallel processing and entropy decoding of the sub-slice data. Along with size or starting address information, a CABAC context initialization idc (cabac_init_idc) could be signaled in each SS_headers. As an alternative to size, or start address signaling, startcodes may be used to locate the positions of the sub-slices within the regular slice.

As an alternative, some or all the sub-slice information relating to the position of the coded sub-slice in the bitstream can be signaled "up front" within the slice header or immediately following, i.e., at the end of, the slice header. In this case, the slice data may be arranged as follows:

|sliceHeader||SS_size0|SS_size1|...
|SS_sizeN||SS_data_0|SS_data1|...|...|sliceHeader....

A slice may include a slice header that includes information ordinarily associated with a slice header and information indicating the size or location or each sub-slice within the regular slice. As shown above, the slice header (sliceHeader) may include size information indicating the size, e.g., in bytes, of each sub-slice (SS_size0, SS_size1, ... SS_sizeN). After the slice header, the slice data may include the sub-slice data (SS_data_0, SS_data_1, ... SS_data_N). As shown above, the slice header for the next regular slice appears at the end of the preceding regular slice.

If a cabac_init_idc is present, it are stored in the SS_data fields. In the SS_size fields, the number of sub-slices present in the regular slice could be signaled by inserting a 0 byte SS size at the end of the slice header. Counting the number of SS_size fields up to the 0 byte SS size field can provide the number of sub-slices in the regular slice. In other examples, the number of sub-slices in the regular slice could be signaled immediately after the slice header.

When video decoder 30 receives a bitstream generated by video encoder 20, video decoder 30 may perform a parsing operation on the bitstream. When video decoder 30 performs the parsing operation, video decoder 30 may extract syntax elements associated with the sub-slices from the bitstream. The syntax elements associated with a sub-slice may include syntax elements associated with CUs in the sub-slice. The syntax elements for a CU may include transform coefficient blocks associated with the CU. In some instances, parsing by extracting the syntax elements associated with a sub-slice may involve performing one or more entropy decoding operations on data in the corresponding coded sub-slices. Hence, parsing may generally include entropy decoding.

Because the sub-slices are independently parseable, video decoder 30 may be able to perform the parsing operations (and associated entropy decoding operations) on data in each different sub-slices of a picture in parallel. For example, the entropy decoding operation may be performed for a sub-slice without using information from any other sub-slices of the picture. Because video decoder 30 is able to perform parsing operations on sub-slices in parallel, video decoder 30 may be able to perform the parsing operations on the sub-slices in less time than if video decoder 30 performed the parsing operations on the sub-slices in sequence.

Furthermore, video decoder 30 may perform reconstruction operations that use the syntax elements associated with a sub-slice to reconstruct pixel values of CUs in the corresponding sub-slice. Because video encoder 20 generated the sub-slices such that the sub-slices can be reconstructed independently, video decoder 30 may be able to perform reconstruction operations on different sub-slices in parallel. For example, if a slice includes a first sub-slice and a second sub-slice, the first sub-slice includes a first set of one or more CUs, and the second sub-slice includes a second set of one or more CUs, video decoder 30 may be able to perform reconstruction operations on CUs corresponding to the first and second sets of CUs in parallel. Because video decoder 30 is able to perform reconstruction operations on sub-slices in parallel, video decoder 30 may be able to reconstruct the sub-slices in less time than if video decoder 30 reconstructed the sub-slices in sequence.

By partitioning slices into sub-slices, video encoder 20 may increase the number of partitions of a picture that can be independently parsed and reconstructed. When there are greater numbers of partitions that can be independently parsed and reconstructed, video decoder 30 may use parallel computing resources to fully reconstruct the picture in less time than when there are fewer partitions that can be independently parsed and reconstructed. Partitioning a picture into additional slices may also increase the number of partitions of a picture that can be independently parsed and reconstructed. However, simply partitioning a picture into slices (as opposed to partitioning slices into sub-slices) may result in the bitstream including more bits than partitioning the slices into sub-slices as described herein.

This may be due, at least in part, to the sizes of slice headers. Each slice header may include a relatively large number of syntax elements. Slice headers for neighboring slices may include syntax elements having the same values. Consequently, if video encoder 20 were to simply partition a picture into slices (without partitioning the slices into sub-slices) each of the slice headers would repeat the same values, thereby increasing the number of bits in the bitstream. In contrast, sub-slice headers may include a relatively small number of syntax elements because the syntax elements common to the sub-slices may be present in the corresponding slice headers and omitted from the sub-slice headers.

Furthermore, HEVC may require the bitstream generated by video encoder 20 to include separate NAL units for each slice. Each NAL unit includes a header that increases the number of bits in the bitstream. In contrast, a single coded slice NAL unit may contain multiple coded sub-slices. Hence, the number of partitions of a picture that can be independently parsed and independently reconstructed may be increased without increasing the numbers of NAL units, and the bits associated with the headers of the NAL units.

As mentioned above, sub-slices can be parsed independently and sub-slices can be reconstructed independently. Thus, it may be unnecessary for video encoder 20 and video decoder 30 to include different logic for determining whether neighboring units are available for parsing and reconstruction. As a result, video encoder 20 and video decoder 30 may be less complex than if sub-slices were parseable independently or sub-slices could be reconstructed independently, but not both. In this way, the use of sub-slices may provide an efficient way of providing independently partitions of pictures that can be parsed and reconstructed independently.

Figure 2:
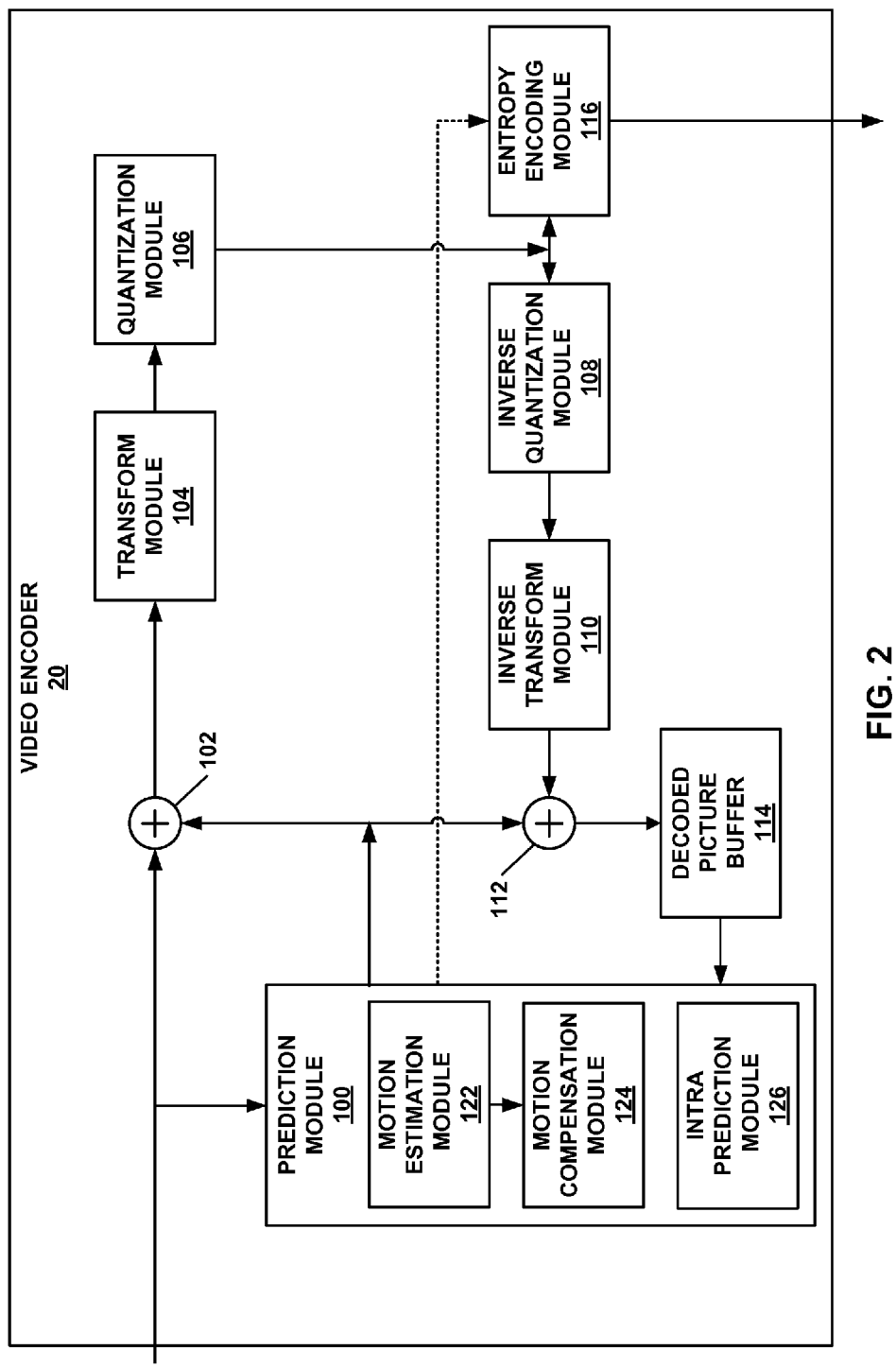
FIG. 2 is a block diagram that illustrates an example configuration of a video encoder.

FIG. 2 is a block diagram that illustrates an example of configuration of video encoder 20 that is configured to implement the techniques of this disclosure. FIG. 2 is provided for purposes of explanation and should not be considered limiting of the techniques as broadly exemplified and described in this disclosure. For purposes of explanation, this disclosure describes video encoder 20 in the context of HEVC coding. However, the techniques of this disclosure may be applicable to other coding standards or methods.

In the example of FIG. 2, video encoder 20 includes a plurality of functional components. The functional components of video encoder 20 include a prediction module 100, a residual generation module 102, a transform module 104, a quantization module 106, an inverse quantization module 108, an inverse transform module 110, a reconstruction module 112, and a decoded picture buffer 114, and an entropy encoding module 116. Prediction module 100 includes a motion estimation module 122, a motion compensation module 124, and an intra-prediction module 126.

In other examples, video encoder 20 may include more, fewer, or different functional components. For example, video encoder 20 may include a deblocking filter to filter the output of reconstruction module 112 to remove blockiness artifacts from reconstructed video. Furthermore, motion estimation module 122 and motion compensation module 124 may be highly integrated, but are represented in the example of FIG. 2 separately for purposes of explanation.

Video encoder 20 may receive video data. In various examples, video encoder 20 may receive the video data from various sources. For example, video encoder 20 may receive the video data from video source 18 (FIG. 1) or another source. The video data may represent sequences of pictures. To encode the video data, video encoder 20 may perform an encoding operation on each sequence of pictures. As part of performing the encoding operation on a sequence of pictures, video encoder 20 may perform encoding operations on each picture within the sequence of pictures. As part of performing the encoding operation on a picture, video encoder 20 may perform encoding operations on each slice in the picture. When video encoder 20 performs an encoding operation on a slice, video encoder 20 generates a coded slice. The coded slice is the slice in its encoded form. The coded slice may include a slice header and slice data. The slice header may contain syntax elements associated with the slice.

As part of performing the encoding operation on a slice, prediction module 100 may partition the slice into a plurality of sub-slices. Video encoder 30 may signal the presence of sub-slice data in a regular slice with a flag in a slice header. Video encoder 20 may perform encoding operations on each of the sub-slices. When video encoder 20 performs an encoding operation on a sub-slice, video encoder 20 generates a coded sub-slice. The coded sub-slice may be the sub-slice in its encoded form. In this disclosure, a coded sub-slice is said to correspond to a sub-slice if the coded sub-slice is a sub-slice in its encoded form. The slice data of a coded slice may include multiple coded sub-slices. The coded sub-slice may include a sub-slice header and sub-slice data. The sub-slice header contains syntax elements associated with the sub-slice.

In various examples, prediction module 100 may partition a slice into a plurality of sub-slices in various ways. For example, prediction module 100 may partition the slice into sub-slices such that each of the sub-slices has an equal number of treeblocks. In another example, prediction module 100 may partition the slice into different numbers of sub-slices based on levels of motion in previously encoded pictures. In some examples, prediction module 100 may partition the slice into sub-slices using similar techniques as used to partition a picture into slices.

As part of performing an encoding operation on a sub-slice, video encoder 20 may perform encoding operations on treeblocks in the sub-slice. When video encoder 20 performs an encoding operation on a treeblock, video encoder 20 may generate a coded treeblock. The coded treeblock may comprise data representing an encoded version of a treeblock. In other words, the coded treeblock may be a treeblock in its encoded form.

As part of performing an encoding operation on a treeblock, prediction module 100 may perform quadtree partitioning on the treeblock to divide the treeblock into progressively smaller CUs. For example, prediction module 100 may partition a treeblock into four equally-sized sub-CUs, partition one or more of the sub-CUs into four equally-sized sub-sub-CUs, and so on.

The sizes of the CUs may range from 8×8 pixels up to the size of the treeblock with a maximum of 64×64 pixels or greater. In this disclosure, "N×N" and "N by N" may be used interchangeably to refer to the pixel dimensions of a video block in terms of vertical and horizontal dimensions, e.g., 16×16 pixels or 16 by 16 pixels. In general, a 16×16 block will have 16 pixels in a vertical direction (y=16) and 16 pixels in a horizontal direction (x=16). Likewise, an N×N block generally has N pixels in a vertical direction and N pixels in a horizontal direction, where N represents a nonnegative integer value.

As part of performing the encoding operation for a treeblock, prediction module 100 may generate a hierarchical quadtree data structure for the treeblock. For example, a treeblock may correspond to a root node of the quadtree data structure. If prediction module 100 partitions the treeblock into four sub-CUs, the root node has four child nodes in the quadtree data structure. Each of the child nodes corresponds to one of the sub-CUs. If prediction module 100 partitions one of the sub-CUs into four sub-sub-CUs, the node corresponding to the sub-CU may have four child nodes, each of which corresponds to one of the sub-sub-CUs.

Each node of the quadtree data structure may provide syntax data for the corresponding CU. For example, a node in the quadtree may include a split flag, indicating whether the CU corresponding to the node is partitioned (i.e., split) into four sub-CUs. Syntax elements for a CU may be defined recursively, and may depend on whether the CU is split into sub-CUs. A CU that is not partitioned may correspond to a leaf node in the quadtree data structure. A leaf node in the quadtree data structure may be referred to as a "coding node." A coded treeblock may include data based on the quadtree data structure for a corresponding treeblock. A coded treeblock is a treeblock in its encoded form. A coded treeblock corresponds to a treeblock when the coded treeblock is the treeblock in its encoded form.

Video encoder 20 may perform encoding operations on each non-partitioned CU of the treeblock. When video encoder 20 performs an encoding operation on a non-partitioned CU, video encoder 20 generates data representing an encoded version of the non-partitioned CU.

As part of performing an encoding operation on a CU, motion estimation module 122 and motion compensation module 124 may perform inter prediction on the CU. In other words, motion estimation module 122 and motion compensation module 124 may generate prediction data for the CU based on decoded samples of reference pictures other than the picture that contains the CU. Inter prediction may provide temporal compression.

To perform inter prediction on a CU, motion estimation module 122 may partition the CU into one or more prediction units (PUs). Video encoder 20 and video decoder 30 may support various PU sizes. Assuming that the size of a particular CU is 2N×2N, video encoder 20 and video decoder 30 may support PU sizes of 2N×2N or N×N, and inter-prediction in symmetric PU sizes of 2N×2N, 2N×N, N×2N, N×N, 2N×nU, nL×2N, nR×2N, or similar. Video encoder 20 and video decoder 30 may also support asymmetric partitioning for PU sizes of 2N×nU, 2N×nD, nL×2N, and nR×2N. In some examples, motion estimation module 122 may partition a CU into PUs along a boundary that does not meet the sides of the CU at right angles.

Motion estimation module 122 may perform a motion estimation operation with regard to each PU of a CU. When motion estimation module 122 performs a motion estimation operation with regard to a PU, motion estimation module 122 may generate one or more motion vectors for the PU. For instance, slices may be I slices, P slices, or B slices. Motion estimation module 122 and motion compensation module 124 may perform different operations for a PU of a CU depending on whether the CU is in an I slice, a P slice, or a B slice. In an I slice, all CUs are intra predicted. Hence, if the CU is in an I slice, motion estimation module 122 and motion compensation module 124 do not perform inter prediction on the CU.

If the CU is in a P slice, the picture containing the CU is associated with a list of reference pictures referred to as "list 0." Each of the reference pictures in list 0 contains samples that may be used for inter prediction of subsequent pictures in decoding order. When motion estimation module 122 performs the motion estimation operation with regard to a PU in a P slice, motion estimation module 122 searches the reference pictures in list 0 for a reference sample for the PU. The reference sample of the PU may be a set of pixel values, e.g., a block of pixels, that most closely corresponds to the pixel values of the PU. Motion estimation module 122 may use a variety of metrics to determine how closely a set of pixel values in a reference picture corresponds to the pixel values of a PU. For example, motion estimation module 122 may determine how closely a set of pixel values in a reference picture corresponds to the pixel values of a PU by sum of absolute difference (SAD), sum of square difference (SSD), or other difference metrics.

After identifying a reference sample of a PU of a CU in a P slice, motion estimation module 122 may generate a reference index that indicates the reference picture in list 0 containing the reference sample and a motion vector that indicates a spatial displacement between the PU and the reference sample. In various examples, motion estimation module 122 may generate motion vectors to varying degrees of precision. For example, motion estimation module 122 may generate motion vectors at one-quarter pixel precision, one-eighth pixel precision, or other fractional pixel precision. In the case of fractional pixel precision, reference pixel values may be interpolated from integer-position pixel values in the reference picture. Motion estimation module 122 may output motion information for the PU to entropy encoding module 116 and motion compensation module 124. The motion information for the PU may include the reference index and the motion vector of the PU. Motion compensation module 124 may use the motion information of PUs of the CU to identify and retrieve the reference samples of the PUs. Motion compensation module 124 may then use pixel values of reference samples of PUs to generate the prediction data for the CU.

If the CU is in a B slice, the picture containing the CU may be associated with two lists of reference pictures, referred to as "list 0" and "list 1." Each of the reference pictures in list 0 contains samples that may be used for inter prediction of subsequent pictures in decoding order. The reference pictures in list 1 occur before the picture in decoding order but after the picture in presentation order. In some examples, a picture containing a B slice may be associated with a list combination that is a combination of list 0 and list 1.

Furthermore, if the CU is in a B slice, motion estimation module 122 may perform uni-directional prediction or bi-directional prediction for PUs of the CU. When motion estimation module 122 performs uni-directional prediction for a PU, motion estimation module 122 may search the reference pictures of list 1 for a reference sample for the PU. Motion estimation module 122 may then generate a reference index that indicates the reference picture in list 1 that contains the reference sample and a motion vector that indicates a spatial displacement between the PU and the reference sample. Motion estimation module 122 may output motion information for PUs of the CU to entropy encoding module 116 and motion compensation module 124. The motion information for the PU may include the reference index, a prediction direction indicator, and the motion vector of the PU. The prediction direction indicator may indicate whether the reference index indicates a reference picture in list 0 or list 1. Motion compensation module 124 may use the motion information of PUs of the CU to identify and retrieve the reference samples of the PUs. Motion compensation module 124 may then use pixel values of reference samples of PUs to generate the prediction data for the CU.

When motion estimation module 122 performs bi-directional prediction for a PU, motion estimation module 122 may search the reference pictures in list 0 for a reference sample for the PU and may also search the reference pictures in list 1 for another reference sample for the PU. Motion estimation module 122 may then generate reference indexes that indicate the reference pictures in list 0 and list 1 containing the reference samples and motion vectors that indicate spatial displacements between the reference samples and the PU. Motion estimation module 122 may output motion information of the PU to entropy encoding module 116 and motion compensation module 124. The motion information for the PU may include the reference indexes and the motion vectors of the PU. Motion compensation module 124 may use the motion information to identify and retrieve the reference samples of the PUs. Motion compensation module 124 may then interpolate pixel values of the prediction data of the CU from pixel values in the reference samples of the PUs of the CU.

In some instances, motion estimation module 122 does not output a full set of motion information for the PU to entropy encoding module 116. Rather, motion estimation module 122 may signal the motion information of a PU with reference to the motion information of another PU. For example, motion estimation module 122 may determine that the motion information of the PU is sufficiently similar to the motion information of a neighboring PU. In this example, motion estimation module 122 may indicate, in a quadtree node for the CU, a value that indicates to video decoder 30 that the PU has the same motion information as the neighboring PU. In another example, motion estimation module 122 may identify, in a quadtree node associated with the CU, a neighboring PU and a motion vector difference (MVD). The motion vector difference indicates a difference between the motion vector of the PU and the motion vector of the indicated neighboring PU. Video decoder 30 may use the motion vector of the indicated neighboring PU and the motion vector difference to predict the motion vector of the PU.

By referring to the motion information of a first PU when signaling the motion information of a second PU, video encoder 20 may be able to signal the motion information of the second PU using fewer bits. However, doing so may prevent video decoder 30 from generating prediction data for the first PU and the second PU in parallel. For instance, video decoder 30 would have to decode the motion information of the first PU before video decoder 30 is able to predict the motion information of the second PU. To ensure that video decoder 30 is able to reconstruct sub-slices in parallel, motion estimation module 122 does not generate motion information for a PU that refers to motion information of PUs that are outside the sub-slice of the PU. In other words, motion vector prediction is not permitted across sub-slice boundaries. Thus, motion estimation module 122 may signal motion information for PUs of inter-predicted CUs in a sub-slice such that prediction of the motion information of the PUs of the inter-predicted CUs of the sub-slice does not depend on motion information of PUs outside the sub-slice.

As part of performing an encoding operation on a CU, intra prediction module 126 may perform intra prediction on the CU. In other words, intra prediction module 126 may generate prediction data for the CU based on decoded pixel values of other CUs. Intra prediction may provide spatial compression.

To perform intra prediction on a CU, intra prediction module 126 may use multiple intra prediction modes to generate multiple sets of prediction data for the CU. When intra prediction module 126 uses an intra prediction mode to generate a set of prediction data for a CU, intra prediction module 126 may extend pixel values from neighboring CUs across the CU in a direction and/or gradient associated with the intra prediction mode. The neighboring CUs may be above, above and to the right, above and to the left, or to the left of the CU, assuming a left-to-right, top-to-bottom encoding order for CUs and treeblocks. Intra prediction module 126 may use various numbers of intra prediction modes, e.g., 33 directional intra prediction modes, depending on the size of the CU.

Intra prediction module 126 may generate the prediction data for CUs in such a way that each sub-slice of a picture is intra-decodable without information from any other sub-slice of the picture. To ensure that each sub-slice is intra-decodable without information from any other sub-slice of the picture, intra prediction module 126 may only use pixel values from a neighboring CU if the neighboring CU is in the same sub-slice as the CU. In other words, intra prediction module 126 may not use pixel values from one sub-slice to generate prediction data for a CU in a different sub-slice. This may ensure that video decoder 30 is able to reconstruct sub-slices in parallel because video decoder 30 does not need to obtain pixels values from CUs outside a particular sub-slice in order to perform intra prediction on CUs in the particular sub-slice. In this way, intra prediction module 126 may encode a sub-slice such that generation of prediction data for intra predicted CUs of the sub-slice does not depend on pixel values of CUs in any other sub-slice. For example, a first CU may neighbor a second CU, but the first CU and the second CU are in different sub-slices. In this example, intra prediction module 126 may not use pixel values of the first CU when performing intra prediction to generate prediction data for the second CU.

Intra prediction module 126 may select one of the sets of prediction data for the CU. In various examples, intra prediction module 126 may select the set of prediction data for the CU in various ways. For example, intra prediction module 126 may select the set of prediction data for the CU by calculating distortion rates for the sets of prediction data and selecting the set of prediction data that has the lowest distortion rate.

Prediction module 100 may select the prediction data for a CU from among the prediction data generated by motion compensation module 124 for the CU or the prediction data generated by intra prediction module 126 for the CU. In some examples, prediction module 100 selects the prediction data for the CU based on error (i.e., distortion) in the sets of prediction data.

If prediction module 100 selects prediction data generated by intra prediction module 126, prediction module 100 may signal the intra prediction mode that was used to generate the prediction data, i.e., the selected intra prediction mode. Prediction module 100 may signal the selected intra prediction mode in various ways. For example, it is probably the selected intra prediction mode is the same as the intra prediction mode of a neighboring CU. In other words, the intra prediction mode of the neighboring CU may be the most probable mode for the current CU. Thus, prediction module 100 may generate a syntax element to indicate that the selected intra prediction mode is the same as the intra prediction mode of the neighboring CU.

While signaling the selected intra prediction mode in this way may reduce the number of bits required to signal the intra prediction mode of the current CU, signaling the selected intra prediction mode in this way may introduce a dependency between the current CU and the neighboring CU. For instance, video decoder 30 may need to reconstruct the neighboring CU before reconstructing the current CU because video decoder 30 would need to access the intra prediction mode of the neighboring CU in order to determine the intra prediction mode of the current CU.

Because video encoder 20 generates the bitstream such that sub-slices can be reconstructed independently, such dependency may not be permitted across sub-slice boundaries. Accordingly, if the neighboring CU is in a different sub-slice than the current CU, prediction module 100 does not generate syntax elements that indicate that video decoder 30 is to predict the intra prediction mode of the current CU based on the intra prediction mode of the neighboring CU. In other words, for each sub-slice of a picture, video encoder 20 may encode the sub-slice such that prediction of intra prediction modes of each intra-predicted CU of the sub-slice does not depend on an intra prediction mode of a CU in any other one of the sub-slices. In this way, video decoder 30 may predict the intra prediction mode for each intra-predicted CU in a sub-slice without accessing intra prediction mode information for of a CU in any other one of the sub-slices. However, if the neighboring CU is in the same sub-slice as the current CU, prediction module 100 may generate syntax elements that indicate that video decoder 30 is to predict the intra prediction mode of the current CU based on the intra prediction mode of the neighboring CU.

After prediction module 100 selects the prediction data for a CU, residual generation module 102 may generate residual data for the CU by subtracting the selected prediction data of the CU from the pixel values of the CU. The residual data of a CU may include 2D residual blocks that correspond to different pixel components of the pixels in the CU. For example, the residual data may include a residual block that corresponds to differences between luminance components of pixels in the prediction data of the CU and luminance components of pixels in the original pixels of the CU. In addition, the residual data of the CU may include residual blocks that correspond to the differences between chrominance components of pixels in the prediction data of the CU and the chrominance components of the original pixels of the CU.

A CU may have one or more transform units (TUs). Each TU of a CU may correspond to a different portion of the residual data of the CU. The sizes of the TUs of a CU may or may not be based on the sizes of PUs of the CU. In some examples, a CU may be subdivided into smaller units using a quadtree structure known as a "residual quad tree" (RQT). The TUs may correspond to nodes of the RQT.

Transform module 104 may generate one or more transform coefficient blocks for each non-partitioned TU of a CU by applying a transform to the residual data corresponding to the non-partitioned TU. Each of the transform coefficient blocks may be a 2D matrix of coefficients. In various examples, transform module 104 may apply various transforms to the residual data corresponding to a TU. For example, transform module may apply a discrete cosine transform (DCT), a directional transform, or a conceptually similar transform.

After transform module 104 generates a transform coefficient block for a TU, quantization module 106 may quantize the coefficients in the transform coefficient block. Quantization generally refers to a process in which coefficients in a transform coefficient block are quantized to possibly reduce the amount of data used to represent the coefficients, providing further compression. Quantization may reduce the bit depth associated with some or all of the coefficients. For example, an n-bit value may be rounded down to an m-bit value during quantization, where n is greater than m.

Inverse quantization module 108 and inverse transform module 110 may apply inverse quantization and inverse transformation to the transform coefficient block, respectively, to reconstruct residual data from the transform coefficient block. Reconstruction module 112 may add the reconstructed residual data to the prediction data generated by motion compensation module 124 or intra prediction module 126 to produce a reconstructed video block for storage in decoded picture buffer 114. Motion estimation module 122 and motion compensation module 124 may use a reference picture that contains the reconstructed video block to perform inter prediction on CUs of subsequent pictures. In addition, intra prediction module 126 may use reconstructed pixel values of CUs of the current picture to perform intra prediction.

Entropy encoding module 116 may receive data from other functional components of video encoder 20. For example, entropy encoding module 116 may receive transform coefficient blocks from quantization module 106 and may receive syntax elements from prediction module 100. When entropy encoding module 116 receives data, entropy encoding module 116 may perform one or more entropy encoding operations to generate entropy encoded data. For example, video encoder 20 may perform a context adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, or another type of entropy encoding operation on the data.

As part of performing an entropy encoding operation on data, entropy encoding module 116 selects a context model. If entropy encoding module 116 is performing a CABAC operation, the context model may indicate estimates of probabilities of particular bins. Context modeling may provide estimates of conditional probabilities of a current symbol given symbols that have already been coded in the neighborhood of the current symbol. In the context of CABAC, the term "bin" is used to refer to a bit of a binarized version of a syntax element. If the entropy encoding module 116 is performing a CAVLC operation, the context model may map coefficients to corresponding codewords. Codewords in CAVLC may be constructed such that relatively short codes correspond to more probable symbols, while relatively long codes correspond to less probable symbols. Selection of an appropriate context model may impact coding efficiency of the entropy encoding operation.

In some instances, entropy encoding module 116 may select the context model for the data based on information generated by performing entropy encoding operations on other sets of data. For example, the residual data associated with neighboring TUs are likely to contain similar pixel values. Accordingly, transform coefficient blocks for neighboring TUs are likely to contain similar transform coefficients. Hence, the probabilities of bins in neighboring transform coefficient blocks are likely to be similar. Accordingly, entropy encoding module 116 may use information regarding the probability of bins in a first transform coefficient block to select a context model for entropy encoding a second, neighboring transform coefficient block.

While selecting a context model for a particular set of data based on information generated by performing entropy encoding operations on other sets of data may increase the coding efficiency of the particular set of data, selecting a context model in this way may prevent the particular set of data from being entropy decoded, and therefore parsed, in parallel with the other sets of data. Rather, video decoder 30 would have to perform entropy decoding on the other sets of data before performing entropy decoding on the particular set of data.

To ensure that video decoder 30 is able to perform entropy decoding operations on data in different coded sub-slices in parallel, entropy encoding module 116 does not select context models for data within a sub-slice based on information generated by performing entropy encoding operations on sets of data in other sub-slices. In other words, for each coded sub-slice, entropy encoding module 116 may use one or more context models to perform entropy encoding operations on data in the coded sub-slice, where none of the context models are selected based on information generated during entropy encoding operations on data in other ones of the coded sub-slices. For example, entropy encoding module 116 may select a default context model when performing an entropy encoding operation on a first transform coefficient block of a first CU of a sub-slice. However, in this example, entropy encoding module 116 may select context models of a second transform coefficient block of the first CU based on information generated by performing the entropy encoding operation on the first transform coefficient block. In another example, a sub-slice header or sub-slice data of a coded sub-slice may include a syntax element that specifies a context model to use to perform an entropy decoding operation on data in the sub-slice data of the coded sub-slice. In this example, the sub-slice header may specify the context model in a CABAC context initialization idc. In some instances, the sub-slice headers of different coded sub-slices may specify different context models. In some examples, CABAC coding would be reset at the beginning of each sub-slice, permitting parallelized CABAC decoding of multiple sub-slices.

Entropy encoding module 116 outputs a bitstream that includes a series of NAL units. As discussed above, each of the NAL units may be a syntax structure containing an indication of a type of data in the NAL unit and bytes containing the data. Each coded slice NAL unit in the bitstream contains a coded slice. A coded slice includes a slice header and slice data. The slice data may include coded sub-slices.

In some examples, the slice header indicates entry points for the coded sub-slices. Each of the entry points may specify a byte offset of a corresponding coded sub-slice. As described below, video decoder 30 may be able to use the entry points to identify locations of the coded sub-slices within the slice data. In some instances, the slice header may also indicate a number of sub-slices. In other instances, the number of sub-slices may be indicated immediately after the slice header. In some examples, the slice data includes start codes that separate the coded sub-slices. As described below, video decoder 30 may be able to identify the locations of the coded sub-slices by scanning through the slice data, looking for the start codes.

Each of the coded sub-slices may include a coded sub-slice header and sub-slice data. The sub-slice data may include coded treeblocks. The coded treeblocks may include one or more coded CUs. Each coded CU may include one or more entropy-encoded transform coefficient blocks.

Figure 3:
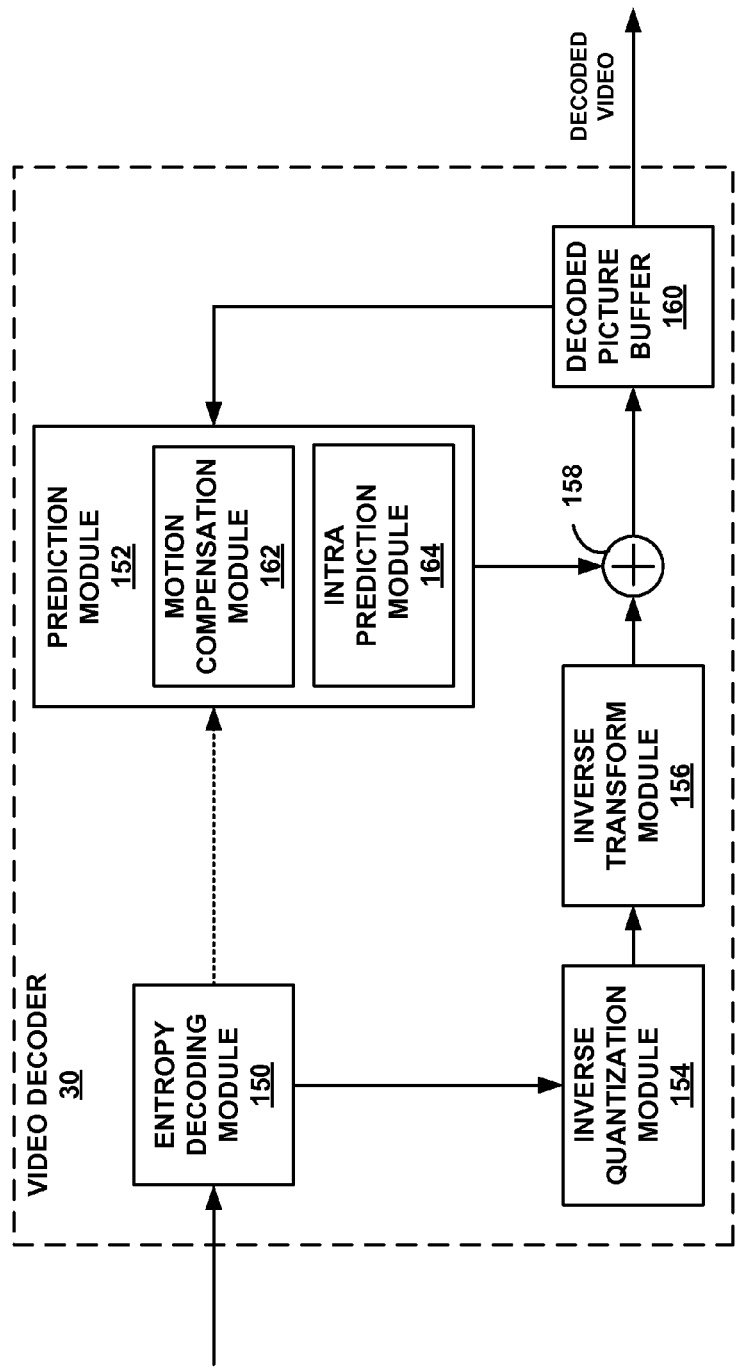
FIG. 3 is a block diagram that illustrates an example configuration of a video decoder.

FIG. 3 is a block diagram that illustrates an example configuration of video decoder 30. FIG. 3 is provided for purposes of explanation and is not limiting on the techniques as broadly exemplified and described in this disclosure. For purposes of explanation, this disclosure describes video decoder 30 in the context of HEVC coding. However, the techniques of this disclosure may be applicable to other coding standards or methods.

In the example of FIG. 3, video decoder 30 includes a plurality of functional components. The functional components of video decoder 30 include an entropy decoding module 150, a prediction module 152, an inverse quantization module 154, an inverse transform module 156, a reconstruction module 158, and a decoded picture buffer 160. Prediction module 152 includes a motion compensation module 162 and an intra prediction module 164. In some examples, video decoder 30 may perform a decoding pass generally reciprocal to the encoding pass described with respect to video encoder 20 of FIG. 2. In other examples, video decoder 30 may include more, fewer, or different functional components. For example, video decoder 30 may include a deblocking filter to filter the output of reconstruction module 158 to remove blockiness artifacts from reconstructed video.

Video decoder 30 may receive a bitstream that comprises encoded video data. When video decoder 30 receives the bitstream, entropy decoding module 150 performs a parsing operation on the bitstream. The parsing operation may include entropy decoding of the bitstream. As a result of performing the parsing operation on the bitstream, entropy decoding module 150 may extract syntax elements from the bitstream. The syntax elements may include entropy-decoded transform coefficient blocks. Prediction module 152, inverse quantization module 154, inverse transform module 156, and reconstruction module 158 may perform a reconstruction operation that uses the syntax elements to generate decoded video data.

As discussed above, the bitstream may comprise a series of NAL units. The NAL units of the bitstream may include sequence parameter set NAL units, picture parameter set NAL units, SEI NAL units, and so on. As part of performing the parsing operation on the bitstream, entropy decoding module 150 may perform parsing operations that extract and entropy decode sequence parameter sets from sequence parameter set NAL units, picture parameter sets from picture parameter set NAL units, SEI data from SEI NAL units, and so on. A sequence parameter set is a syntax structure that contains syntax elements that apply to zero or more entire coded video sequences. A picture parameter set is a syntax structure containing syntax elements that apply to zero or more entire coded pictures. A picture parameter set associated with a given picture may include a syntax element that identifies a sequence parameter set associated with the given picture.

In addition, the NAL units of the bitstream may include coded slice NAL units. As part of performing the parsing operation on the bitstream, entropy decoding module 150 may perform parsing operations that extract and entropy decode coded slices from the coded slice NAL units. Each of the coded slices may include a slice header and slice data. The slice header may contain syntax elements pertaining to a slice. The syntax elements in the slice header may include a syntax element that identifies a picture parameter set associated with a picture that contains the slice. Entropy decoding module 150 may perform an entropy decoding operation, such as a CAVLC decoding operation, on the coded slice header to recover the slice header.

As part of performing the parsing operations to extract and entropy decode the sub-slices, entropy decoding module 150 may perform parsing operations to extract coded sub-slices from the slice data of a coded slice. In various examples, entropy decoding module 150 may extract coded sub-slices from the slice data in various ways. For instance, in some examples, the slice header may include position signaling data that entropy decoding module 150 may use to identify positions within the slice data of coded sub-slices. In some instances, the position signaling data is within the slice header or at the end of the slice header. In various examples, the slice header may include various types of position signaling data. For example, the slice header may indicate entry points for the coded sub-slices. Each of the entry points may specify a byte offset of a corresponding coded sub-slice. In this example, an entry point may specify that a particular coded sub-slice begins at byte 128 of the slice data, another entry point may specify that another coded sub-slice begins at byte 256 of the slice data, and so on. In other instances, the position signaling data is interleaved into the slice data between coded sub-slices.

In other examples, the slice data may include start codes for each of the coded sub-slices in the coded slice. The start codes may be values that separate the coded sub-slices. Entropy decoding module 150 may scan through the slice data, looking for the start codes. When entropy decoding module 150 finds a start code in the slice data, entropy decoding module 150 has found the location of a coded sub-slice within the slice data. For example, each of the start codes may have the binary value 0101010. In this example, entropy decoding module 150 may scan through the slice data, identify occurrences of the binary value 0101010, and hence identify locations within the slice data of the coded sub-slices.

After extracting a coded sub-slice from the slice data, entropy decoding module 150 may perform parsing operations that extract a coded sub-slice header and sub-slice data from the coded sub-slice. As discussed above, the sub-slice header may include syntax elements that are associated with the corresponding sub-slice. The sub-slice header may include fewer syntax elements than the slice header. Accordingly, a sub-slice header may be referred to herein as a "lightweight" header. Entropy decoding module 150 may perform an entropy decoding operation, such as a CAVLC decoding operation, on the coded sub-slice header to recover the sub-slice header.

After extracting the sub-slice data from a coded sub-slice, entropy decoding module 150 may extract coded treeblocks from the sub-slice data. Entropy decoding module 150 may then extract coded CUs from the coded treeblocks. Entropy decoding module 150 may perform parsing operations that extract syntax elements from the coded CUs. The extracted syntax elements may include entropy-encoded transform coefficient blocks. Entropy decoding module 150 may then perform entropy decoding operations on the syntax elements. For instance, entropy decoding module 150 may perform CABAC operations on the transform coefficient blocks.

When entropy decoding module 150 performs an entropy decoding operation on a set of data, entropy decoding module 150 may select a context model. In examples where entropy decoding module 150 uses CABAC, the context model may indicate probabilities of particular bins. In examples where entropy decoding module 150 uses CAVLC, the context model may indicate a mapping between codewords and the corresponding data. Entropy decoding module 150 may then use the selected context model to perform the entropy decoding operation on the set of data.

When entropy decoding module 150 performs parsing operations on a sub-slice, entropy decoding module 150 may not select context models for performing entropy decoding operations on data (e.g., sub-slice headers, CU headers, transform coefficient blocks, etc.) of the corresponding coded sub-slice based on information generated by performing parsing operations on data of another sub-slice. However, entropy decoding module 150 may select context models for performing entropy decoding operations on data of the coded sub-slice based on information generated by performing parsing operations on other data of the same coded sub-slice. In this way, each sub-slice of a slice is parseable independently of each other sub-slice of the slice. In particular, data in each coded sub-slice may entropy decoded with reference to information from other sub-slices, e.g., for context modeling or otherwise. Because each sub-slice of a slice is independently parseable, entropy decoding module 150 may be able to perform parsing operations on the data in different coded sub-slices in parallel.

For example, a coded slice may include a first coded sub-slice and a second coded sub-slice. In this example, entropy decoding module 150 does not need to perform an entropy decoding operation on data in the first coded sub-slice in order to select a context model to use for entropy decoding data in the second coded sub-slice, and vice versa. In other words, entropy decoding module 150 may use one or more context models to entropy decode data in the first coded sub-slice, where the first coded sub-slice is encoded such that selection of the one or more context models used to entropy decode the data in the first coded sub-slice does not depend on information from the second coded sub-slice. Likewise, entropy decoding module 150 may use one or more context models to entropy decode the second coded sub-slice, where the second coded sub-slice is encoded such that selection of the one or more context models used to entropy decode the second coded sub-slice does not depend on information from the first coded sub-slice.

After entropy decoding module 150 performs a parsing operation on a non-partitioned CU, video decoder 30 may perform a reconstruction operation on the non-partitioned CU. To perform the reconstruction operation on a non-partitioned CU, video decoder 30 may, at each level of the residual quadtree of the CU, perform a reconstruction operation on each TU of the CU. By performing the reconstruction operation for each TU of the CU, video decoder 30 may reconstruct the residual data of the CU.

As part of performing a reconstruction operation on a non-partitioned TU, inverse quantization module 154 may inverse quantize, i.e., de-quantize, the transform coefficient blocks associated with the TU. Inverse quantization module 154 may inverse quantize the transform coefficient blocks in a manner similar to the inverse quantization processes proposed for HEVC or defined by the H.264 decoding standard. Inverse quantization module 154 may use a quantization parameter $QP_Y$ calculated by video encoder 20 for a CU of the transform coefficient block to determine a degree of quantization and, likewise, a degree of inverse quantization for inverse quantization module 154 to apply.

After inverse quantization module 154 inverse quantizes a transform coefficient block, inverse transform module 156 may generate residual data for the TU associated with the transform coefficient block. Inverse transform module 156 may generate the residual data for the TU at least in part by applying an inverse transform to the transform coefficient block. For example, inverse transform module 156 may apply an inverse DCT, an inverse integer transform, an inverse Karhunen-Loeve transform (KLT), an inverse rotational transform, an inverse directional transform, or another inverse transform to the transform coefficient block. In some examples, inverse transform module 156 may determine an inverse transform to apply to the transform coefficient block based on signaling from video encoder 20. In such examples, inverse transform module 156 may determine the inverse transform based on a signaled transform at the root node of a quadtree for a treeblock associated with the transform coefficient block. In other examples, inverse transform module 156 may infer the inverse transform from one or more coding characteristics, such as block size, coding mode, or the like. In some examples, inverse transform module 156 may apply a cascaded inverse transform.

If the CU was encoded using inter prediction, motion compensation module 162 may perform motion compensation to generate prediction data for the CU. Motion compensation module 162 may use motion information for the PUs of the CU to identify reference samples for the PUs. The reference sample of a PU may be in a different temporal picture than the PU. The motion information for a PU may include a motion vector, a reference picture index, and a prediction direction. Motion compensation module 162 may then use the reference samples for the PUs to generate prediction data for the CU. In some instances, the reference sample of a PU in a particular sub-slice may or may not be co-located with the particular sub-slice.

In some examples, motion compensation module 162 may predict the motion information for PUs of the CU based on motion information of PUs of CUs that neighbor the CU. Because video encoder 20 encodes sub-slices such that the sub-slices can be reconstructed independently, motion compensation module 162 does not need to access the motion information of any PU outside the sub-slice of a given CU in order to predict the motion information of PUs of the given CU. For instance, motion compensation module 162 may predict motion information for PUs of inter predicted CUs of a sub-slice, where the sub-slice is encoded such that prediction of the motion information for the PUs of the inter-predicted CUs in the sub-slice does not depend on motion information of PUs in other sub-slices. In this disclosure, a CU is an inter-predicted CU if video encoder 20 uses inter prediction to encode the CU.

In some examples, motion compensation module 162 may refine the prediction data for a CU by performing interpolation based on interpolation filters. Identifiers for interpolation filters to be used for motion compensation with sub-pixel precision may be included in the syntax elements. Motion compensation module 162 may use the same interpolation filters used by video encoder 20 during generation of the prediction data of the CU to calculate interpolated values for sub-integer pixels of a reference block. Motion compensation module 162 may determine the interpolation filters used by video encoder 20 according to received syntax information and use the interpolation filters to produce prediction data.

If a CU is encoded using intra prediction, intra prediction module 164 may perform intra prediction to generate prediction data for the CU. For example, intra prediction module 164 may determine an intra prediction mode for the CU based on syntax elements in the bitstream. The bitstream may include syntax elements that intra prediction module 164 may use to predict the intra prediction mode of the CU. In some instances, the syntax elements may indicate that intra prediction module 164 is to use the intra prediction mode of another CU to predict the intra prediction mode of the CU. For example, it may be probable that the intra prediction mode of the CU is the same as the intra prediction mode of a neighboring CU. In other words, the intra prediction mode of the neighboring CU may be the most probable mode for the current CU. Hence, in this example, the bitstream may include a small syntax element that indicates that the intra prediction mode of the CU is the same as the intra prediction mode of the neighboring CU. Because the sub-slices can be reconstructed independently, the syntax elements do not indicate that intra prediction module 164 is to use the intra prediction mode of a CU in another sub-slice to predict the intra prediction mode of the CU.

Intra prediction module 164 may then use the intra prediction mode to generate prediction data (e.g., predicted pixel values) for the CU based on the pixel values of spatially neighboring CUs. Because video encoder 20 encodes sub-slices such that the sub-slices can be reconstructed independently, intra prediction module 164 does not need to access the pixel values of any CU outside the sub-slice of a given CU in order to generate the prediction data of the given CU. For instance, intra prediction module 164 may generate prediction data for each intra predicted CU in a sub-slice, where the corresponding coded sub-slice is encoded such that generation of the prediction data for the intra predicted CUs in the sub-slice does not depend on pixel values of CUs in other sub-slices. In this disclosure, a CU is an intra-predicted CU if video encoder 20 uses intra prediction to encode the CU. Hence, for intra-prediction and reconstruction of a CU within a given sub-slice, video decoder 30 does not use spatial reference samples from another sub-slice. In this manner, the parsing operations and reconstruction operations may be performed independently for each sub-slice, promoting parallelized parsing and reconstruction operations for a slice.

Reconstruction module 158 may use the residual data of a CU and the prediction data for the CU, i.e., either intra-prediction data or inter-prediction data, as applicable, to reconstruct pixel values for the CU. In some examples, video decoder 30 may apply a deblocking filter to remove blockiness artifacts from the reconstructed pixel values filter of a slice or picture. Decoded picture buffer 160 may store the decoded pixel values for pictures of the video data. Decoded picture buffer 160 may provide reference pictures for subsequent motion compensation, intra prediction, and presentation on a display device, such as display device 34 of FIG. 1.

Figure 4:
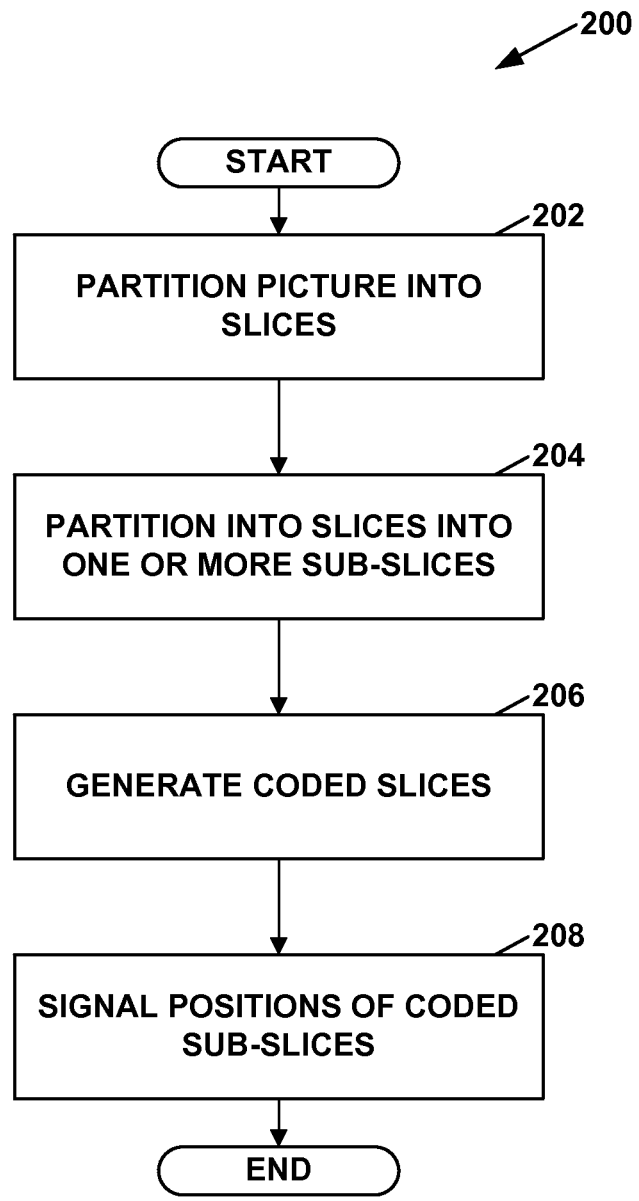
FIG. 4 is a flowchart that illustrates an example operation performed by the video encoder to generate a coded picture.

FIG. 4 is a flowchart that illustrates an example operation 200 performed by video encoder 20 to generate a coded picture. After video encoder 20 starts operation 200, video encoder 20 may partition a picture into one or more slices (202). Video encoder 20 may then partition each of the slices into one or more sub-slices (204). After partitioning the slices into sub-slices, video encoder 20 may generate coded slices by encoding the slices of the picture (206). Generation of coded slices (206) may include inter- and/or intra-predictive coding of the sub-slice data and entropy coding of the sub-slice data. When video encoder 20 generates a coded slice by encoding a slice of the picture, the coded slice may comprise coded sub-slices that correspond to the sub-slices of the slice. Video encoder 20 may generate the coded sub-slice such that each of the sub-slices can be parsed and reconstructed independently of the other sub-slices.

Video encoder 20 may generate information to signal positions within the coded slices of the coded sub-slices (208). As described above, video encoder 20 may signal the positions of the coded sub-slices in various ways. For example, video encoder 20 may signal the positions of the coded sub-slices by including position signaling data in a slice header of a coded slice to extract the coded sub-slices from the coded slice. In this example, the position signaling data may indicate starting byte positions of the coded sub-slices, byte sizes of the coded sub-slices, or other data that video decoder 30 may use to identify the positions of the coded sub-slices within the coded slice. In another example, video encoder 20 may signal the positions within the coded slices of the coded sub-slices by signaling in the slice data start codes for the coded sub-slices. In some examples, video encoder 20 may interleave information indicating sub-slice sizes or sub-slice starting byte positions with the sub-slice data.

Figure 5:
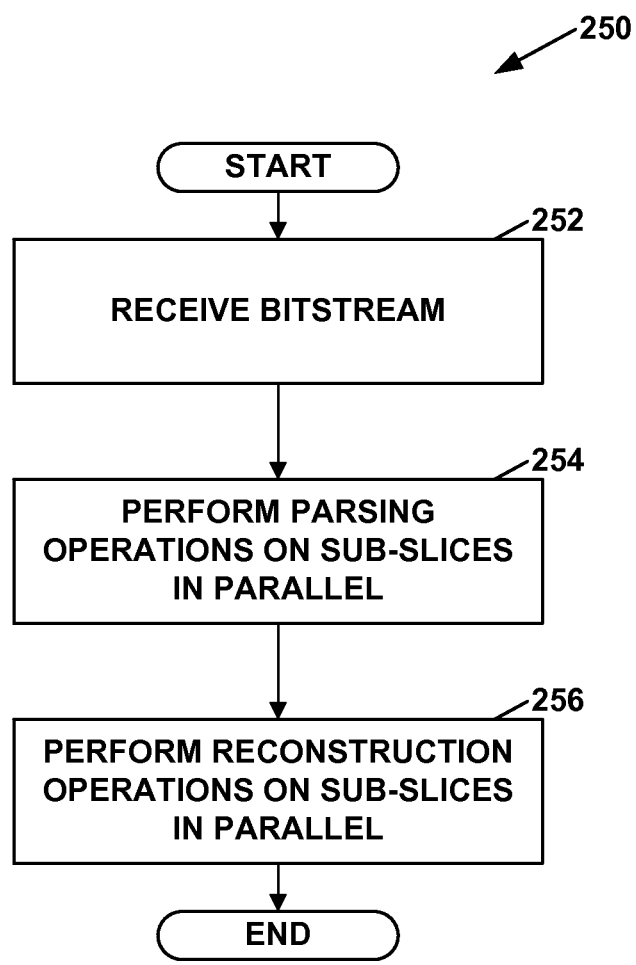
FIG. 5 is a flowchart that illustrates an example operation performed by the video decoder.

FIG. 5 is a flowchart that illustrates an example operation 250 performed by video decoder 30. After video decoder 30 starts operation 250, video decoder 30 receives a bitstream generated by video encoder 20 (252). The bitstream may comprise a series of NAL units. The NAL units may include one or more coded slice NAL units. The coded slice NAL units may contain coded slices that correspond to different slices.

In response to receiving a coded slice NAL unit, video decoder 30 may perform parsing operations on two or more sub-slices in parallel (254). To perform a parsing operation on a sub-slice, video decoder 30 may extract the corresponding coded sub-slice from the slice data of the coded slice contained in the coded slice NAL unit. Video decoder 30 may then extract syntax elements associated with a sub-slice from the coded sub-slice. In order to extract the syntax elements associated with the sub-slice from the coded sub-slice, video decoder 30 may perform one or more entropy decoding operations on data in the coded sub-slice.

In some examples, video decoder 30 may use position signaling data in a slice header of the coded slice to extract the coded sub-slices from the slice data of the coded slice. In such examples, the position signaling data may indicate starting byte positions of the coded sub-slices, byte sizes of the coded sub-slices, or other data that video decoder 30 may use to identify the locations of coded sub-slices within the slice data of the coded slice. In other examples, the slice data may include start codes that indicate starting points of coded sub-slices. In such examples, video decoder 30 may identify the locations of the start codes within the slice data and extract, based on the locations within the slice data of the start codes, the coded sub-slices from the slice data.

Furthermore, after performing the parsing operations on two or more of the sub-slices in the coded slice NAL unit, video decoder 30 may perform reconstruction operations on two or more of the sub-slices in parallel (256). By performing the reconstruction operations on the sub-slices, video decoder 30 may reconstruct pixel values for treeblocks in the sub-slices from the syntax elements associated with the corresponding sub-slices.

Figure 6:
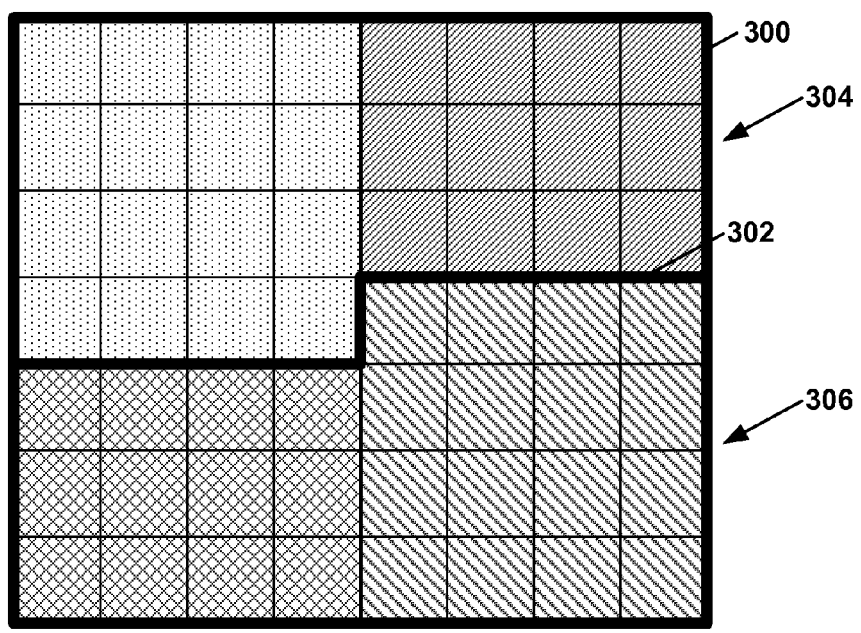
FIG. 6 is a conceptual diagram that illustrates an example picture partitioned into slices and sub-slices.

FIG. 6 is a conceptual diagram that illustrates a picture 300 partitioned into slice and sub-slices. The darker line 302 near the horizontal midpoint of picture 300 indicates a boundary between a slice 304 and a slice 306 of picture 300. In the example of FIG. 6, the cells within picture 300 may correspond to treeblocks. Sections of slices 304 and slices 306 with different crosshatching may correspond to different sub-slices of slices 304 and 306.

It is to be recognized that depending on the embodiment, certain acts or events of any of the methods described herein may be performed in a different sequence, may be added, merged, or left out altogether (e.g., not all described acts or events are necessary for the practice of the method). Moreover, in certain embodiments, acts or events may be performed concurrently, e.g., through multi-threaded processing, interrupt processing, or multiple processors, rather than sequentially.

Those of skill will recognize that the various illustrative logical blocks, modules, circuits, and algorithm steps described in connection with the methods, systems, and apparatuses disclosed herein may be implemented as electronic hardware, computer software executed by a processor, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Moreover, embodiments disclosed herein may be implemented or performed with an electronic device or circuit such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor may read information from, and write information to, the storage medium. In the alternative, the storage medium may be integral to the processor. The storage medium may form part of a computer program product. The processor and the storage medium may reside in an ASIC. The ASIC may reside in a user terminal. In the alternative, the processor and the storage medium may reside as discrete components in a user terminal.

What is claimed is:

1. A method for encoding video data, the method comprising:
    encoding a slice of a picture in the video data to form a coded slice,
        the slice comprising multiple treeblocks,
        the slice being partitioned into a plurality of sub-slices,
        each respective sub-slice of the plurality of sub-slices comprising multiple treeblocks of the slice, and
        encoding the slice comprising:
            including, in the coded slice, a plurality of coded sub-slices,
                each respective one of the coded sub-slices corresponding to a respective sub-slice from the plurality of sub-slices, and
                each of the sub-slices can be entropy decoded independently of each other one of the sub-slices and each of the sub-slices can be reconstructed independently of each other one of the sub-slices, and
            including, in the coded slice, a slice header including all information signaling starting byte positions or byte sizes of the coded sub-slices.

2. The method of claim 1, wherein the coded slice comprises the slice header and the coded sub-slices include sub-slice headers, each of the sub-slice headers including fewer syntax elements than the slice header.

3. The method of claim 1, further comprising generating a coded slice network abstraction layer (NAL) unit that contains the coded slice.

4. The method of claim 1,
    wherein each of the sub-slices is entropy decodable without using information from any other sub-slice of the picture, and
    wherein each of the sub-slices is intra-decodable without information from any other sub-slice of the picture.

5. The method of claim 4, further comprising, for each of the coded sub-slices, using one or more context models to perform entropy encoding operations on data in the coded sub-slice, wherein none of the context models are selected based on information generated during entropy encoding operations on data in other ones of the coded sub-slices.

6. The method of claim 1, wherein the slice is a first slice of the picture, said method further comprising:
    partitioning the picture into the first slice and a second slice; and
    partitioning the first slice into the plurality of sub-slices.

7. The method of claim 1, further comprising, for each sub-slice in the plurality of sub-slices, encoding the sub-slice such that generation of prediction data for intra predicted coding units (CUs) of the sub-slice does not depend on pixel values of CUs in any other one of the sub-slices.

8. The method of claim 1, further comprising, for each sub-slice in the plurality of sub-slices, encoding the sub-slice such that prediction of intra prediction modes of each intra-predicted CU of the sub-slice does not depend on an intra prediction mode of a CU in any other one of the sub-slices.

9. The method of claim 1, further comprising, for each sub-slice in the plurality of sub-slices, signaling motion information of prediction units (PUs) of inter predicted CUs in the sub-slice such that prediction of the motion information of the PUs of the inter predicted CUs of the sub-slice does not depend on motion information of PUs outside the sub-slice.

10. A method of decoding video data, the method comprising:
receiving a coded slice, the coded slice being an encoded form of a slice of a picture in the video data, the slice comprising multiple treeblocks, the slice including a first sub-slice and a second sub-slice, each of the first sub-slice and the second sub-slice comprising multiple treeblocks of the slice, the coded slice comprising a first coded sub-slice and a second coded sub-slice that correspond to the first sub-slice and the second sub-slice respectively, wherein the first and second coded sub-slices are encoded such that the first and second sub-slices can be entropy decoded independently of each other and can be reconstructed independently of each other;
parsing the first and second sub-slices in parallel using position signaling information in a slice header of the coded slice to extract the first and second coded sub-slices from the coded slices, wherein the position signaling information indicates starting byte positions or byte sizes of the first and second coded sub-slices; and
reconstructing the first and second sub-slices in parallel.

11. The method of claim 10, wherein the coded slice includes the slice header and slice data, the slice data including the first and second coded sub-slices, the first coded sub-slice including a first sub-slice header, the second coded sub-slice including a second sub-slice header, both the first and second sub-slice headers including fewer syntax elements than the slice header.

12. The method of claim 10, the receiving the coded slice comprising:
receiving a coded slice network abstraction layer (NAL) unit that contains the coded slice.

13. The method of claim 10, the parsing the first and second sub-slices comprising:
extracting the first and second coded sub-slices from the coded slice;
performing an entropy decoding operation on data in the first coded sub-slice; and
performing an entropy decoding operation on data in the second coded sub-slice.

14. The method of claim 13,
the performing the entropy decoding operation on the data in the first coded sub-slice comprises:
using one or more context models to entropy decode the data in the first coded sub-slice, wherein the first coded sub-slice is encoded such that selection of the one or more context models used to entropy decode the data in the first coded sub-slice does not depend on information from the second coded sub-slice; and
the performing the entropy decoding operation on the data in the second coded sub-slice comprises:
using one or more context models to entropy decode the data in the second coded sub-slice, wherein the second coded sub-slice is encoded such that selection of the one or more context models used to entropy decode the data in the second coded sub-slice does not depend on information from the first coded sub-slice.

15. The method of claim 14,
the performing the entropy decoding operation on the data in the first coded sub-slice further comprises:
performing a Context-Adaptive Binary Arithmetic Coding (CABAC) operation on the data in the first coded sub-slice; and
the performing the entropy decoding operation on the data in the second coded sub-slice further comprises:
performing the CABAC operation on the data in the second coded sub-slice.

16. The method of claim 10, the reconstructing the first and second sub-slices comprising:
generating prediction data for each intra-predicted coding unit (CU) in the first sub-slice, wherein the first coded sub-slice is encoded such that generation of the prediction data for intra-predicted CUs in the first sub-slice does not depend on pixel values of CUs in the second sub-slice; and
generating prediction data for each intra-predicted CU in the second sub-slice, wherein the second coded sub-slice is encoded such that generation of the prediction data for intra-predicted CUs in the second sub-slice does not depend on pixel values of CUs in the first sub-slice.

17. The method of claim 10, the reconstructing the first and second sub-slices comprising:
predicting intra prediction modes for each intra-predicted CU in the first sub-slice without accessing intra prediction mode information of a CU in any other sub-slice of the picture; and
predicting intra prediction modes for each intra-predicted CU in the second sub-slice without accessing intra prediction mode information of a CU in any other sub-slice of the picture.

18. The method of claim 10, the reconstructing the first and second sub-slices comprising:
predicting motion information for prediction units (PUs) of inter predicted CUs in the first sub-slice, wherein the first coded sub-slice is encoded such that prediction of the motion information for the PUs of the inter predicted CUs in the first sub-slice does not depend on motion information of PUs in the second sub-slice; and
predicting motion information for PUs of inter predicted CUs in the second sub-slice, wherein the second coded sub-slice is encoded such that prediction of the motion information for the PUs of the inter predicted CUs in the second sub-slice does not depend on motion information of PUs in the first sub-slice.

19. A video encoding apparatus that comprises:
a memory configured to store video data; and
one or more processors that are configured to:
encode a slice of a picture to form a coded slice of the video data,
the slice comprising multiple treeblocks,
the slice being partitioned into a plurality of sub-slices,
each respective sub-slice of the plurality of sub-slices comprising multiple treeblocks of the slice, and
to encode the slice, the one or more processors:
include, in the coded slice, a plurality of coded sub-slices,
each respective one of the coded sub-slices corresponding to a respective sub-slice from the plurality of sub-slices, and
each of the sub-slices can be entropy decoded independently of each other one of the sub-slices and each of the sub-slices can be reconstructed independently of each other one of the sub-slices, and include, in the coded slice, a slice header including all information signaling starting byte positions or byte sizes of the coded sub-slices.

20. The video encoding apparatus of claim 19, wherein the coded slice comprises the slice header and the coded sub-slices include sub-slice headers, each of the sub-slice headers including fewer syntax elements than the slice header.

21. The video encoding apparatus of claim 19, wherein the one or more processors are configured to:
generate a coded slice network abstraction layer (NAL) unit that contains the coded slice.

22. The video encoding apparatus of claim 19,
wherein each of the sub-slices is entropy decodable without using information from any other sub-slice of the picture, and
wherein each of the sub-slices is intra-decodable without information from any other sub-slice of the picture.

23. The video encoding apparatus of claim 19, wherein, for each of the coded sub-slices, the one or more processors are configured to:
use one or more context models to perform entropy encoding operations on data in the coded sub-slice, wherein none of the context models are selected based on information generated during entropy encoding operations on data in other ones of the coded sub-slices.

24. The video encoding apparatus of claim 19, wherein the slice is a first slice of the picture, and the one or more processors are further configured to:
partition the picture into the first slice and a second slice; and
partition the first slice into the plurality of sub-slices.

25. The video encoding apparatus of claim 19, wherein, for each sub-slice in the plurality of sub-slices, the one or more processors are configured to:
encode the sub-slice such that generation of prediction data for intra predicted coding units (CUs) of the sub-slice does not depend on pixel values of CUs in any other one of the sub-slices.

26. The video encoding apparatus of claim 19, wherein, for each sub-slice in the plurality of sub-slices, the one or more processors are configured to:
encode the sub-slice such that prediction of intra prediction modes of each intra-predicted CU of the sub-slice does not depend on an intra prediction mode of a CU in any other one of the sub-slices.

27. The video encoding apparatus of claim 19, wherein, for each sub-slice in the plurality of sub-slices, the one or more processors are configured to:
signal motion information for prediction units (PUs) of inter predicted CUs in the sub-slice such that prediction of the motion information of the PUs of the inter predicted CUs of the sub-slice does not depend on motion information of PUs outside the sub-slice.

28. A video decoding apparatus comprising:
a memory; and
one or more processors configured to:
receive a coded slice of video data, the coded slice being an encoded form of a slice of a picture, the slice comprising multiple treeblocks, the slice including a first sub-slice and a second sub-slice, each of the first sub-slice and the second sub-slice comprising multiple treeblocks of the slice, the coded slice comprising a first coded sub-slice and a second coded sub-slice that correspond to the first sub-slice and the second sub-slice respectively, wherein the first and second coded sub-slices are encoded such that the first and second sub-slices can be entropy decoded independently of each other and can be reconstructed independently of each other;
parse the first and second sub-slices in parallel using position signaling information in a slice header of the coded slice to extract the first and second coded sub-slices from the coded slices, wherein the position signaling information indicates starting byte positions or byte sizes of the first and second coded sub-slices;
reconstruct the first and second sub-slices in parallel; and
store the reconstructed video data for the picture in the memory.

29. The video decoding apparatus of claim 28, wherein the coded slice includes the slice header and slice data, the slice data including the first and second coded sub-slices, the first coded sub-slice including a first sub-slice header, the second coded sub-slice including a second sub-slice header, both the first and second sub-slice headers including fewer syntax elements than the slice header.

30. The video decoding apparatus of claim 28, wherein the one or more processors are configured to receive a coded slice network abstraction layer (NAL) unit that contains the coded slice.

31. The video decoding apparatus of claim 28, wherein the one or more processors are configured to:
extract the first and second coded sub-slices from the coded slice;
perform an entropy decoding operation on data in the first coded sub-slice; and
perform an entropy decoding operation on data in the second coded sub-slice.

32. The video decoding apparatus of claim 31,
to perform the entropy decoding operation on the data in the first coded sub-slice, the one or more processors:
use one or more context models to entropy decode the data in the first coded sub-slice, wherein the first coded sub-slice is encoded such that selection of the one or more context models used to entropy decode the data in the first coded sub-slice does not depend on information from the second coded sub-slice; and
to perform the entropy decoding operation on the data in the second coded sub-slice, the one or more processors:
use one or more context models to entropy decode the data in the second coded sub-slice, wherein the second coded sub-slice is encoded such that selection of the one or more context models used to entropy decode the data in the second coded sub-slice does not depend on information from the first coded sub-slice.

33. The video decoding apparatus of claim 32,
to perform the entropy decoding operation on the data in the first coded sub-slice, the one or more processors:
perform a Context-Adaptive Binary Arithmetic Coding (CABAC) operation on the data in the first coded sub-slice; and
to perform the entropy decoding operation on the data in the second coded sub-slice, the one or more processors:
perform the CABAC operation on the data in the second coded sub-slice.

34. The video decoding apparatus of claim 28, wherein to reconstruct the first and second sub-slices, the one or more processors:
generate prediction data for each intra-predicted coding unit (CU) in the first sub-slice, wherein the first coded sub-slice is encoded such that generation of the prediction data for intra-predicted CUs in the first sub-slice does not depend on pixel values of CUs in the second sub-slice; and generate prediction data for each intra-predicted CU in the second sub-slice, wherein the second coded sub-slice is encoded such that generation of the prediction data for intra-predicted CUs in the second sub-slice does not depend on pixel values of CUs in the first sub-slice.

35. The video decoding apparatus of claim 28, wherein to reconstruct the first and second sub-slices, the one or more processors:
    predict intra prediction modes for each intra-predicted CU in the first sub-slice without accessing intra prediction mode information of a CU in any other sub-slice of the picture; and
    predict intra prediction modes for each intra-predicted CU in the second sub-slice without accessing intra prediction mode information of a CU in any other sub-slice of the picture.

36. The video decoding apparatus of claim 28, wherein to reconstruct the first and second sub-slices, the one or more processors:
    predict motion information for prediction units (PUs) of inter predicted CUs in the first sub-slice, wherein the first coded sub-slice is encoded such that prediction of the motion information for the PUs of the inter predicted CUs in the first sub-slice does not depend on motion information of PUs in the second sub-slice; and
    predict motion information for PUs of inter predicted CUs in the second sub-slice, wherein the second coded sub-slice is encoded such that prediction of the motion information for the PUs of the inter predicted CUs in the second sub-slice does not depend on motion information of PUs in the first sub-slice.

37. A video encoding apparatus comprising:
    means for encoding a slice of a picture in video data to form a coded slice,
        the slice comprising multiple treeblocks,
        the slice being partitioned into a plurality of sub-slices,
        each respective sub-slice of the plurality of sub-slices comprising multiple treeblocks of the slice, and
        encoding the slice comprising:
            including, in the coded slice, a plurality of coded sub-slices,
                each respective one of the coded sub-slices corresponding to a respective sub-slice from the plurality of sub-slices, and
                each of the sub-slices can be entropy decoded independently of each other one of the sub-slices and each of the sub-slices can be reconstructed independently of each other one of the sub-slices, and
    means for including, in the coded slice, a slice header including all information signaling starting byte positions or byte sizes of the coded sub-slices.

38. A video decoding apparatus comprising:
    means for receiving a coded slice, the coded slice being an encoded form of a slice of a picture, the slice comprising multiple treeblocks, the slice including a first sub-slice and a second sub-slice, each of the first sub-slice and the second sub-slice comprising multiple treeblocks of the slice, the coded slice comprising a first coded sub-slice and a second coded sub-slice that correspond to the first sub-slice and the second sub-slice respectively, wherein the first and second coded sub-slices are encoded such that the first and second sub-slices can be entropy decoded independently of each other and can be reconstructed independently of each other;
    means for parsing the first and second sub-slices in parallel using position signaling information in a slice header of the coded slice to extract the first and second coded sub-slices from the coded slices, wherein the position signaling information indicates starting byte positions or byte sizes of the first and second coded sub-slices; and
    means for reconstructing the first and second sub-slices in parallel.

39. A non-transitory computer storage medium that stores computer-executable instructions that configure one or more processors to:
    encode a slice of a picture in video data to form a coded slice,
        the slice comprising multiple treeblocks,
        the slice being partitioned into a plurality of sub-slices,
        each respective sub-slice of the plurality of sub-slices comprising multiple treeblocks of the slice, and
        as part of encoding the slice:
            include, in the coded slice, a plurality of coded sub-slices,
                each respective one of the coded sub-slices corresponding to a respective sub-slice from the plurality of sub-slices, and
                each of the sub-slices can be entropy decoded independently of each other one of the sub-slices and each of the sub-slices can be reconstructed independently of each other one of the sub-slices, and
            include, in the coded slice, a slice header including all information signaling starting byte positions or byte sizes of the coded sub-slices.

40. A non-transitory computer storage medium that stores computer-executable instructions that configure one or more processors to:
    receive a coded slice, the coded slice being an encoded form of a slice of a picture, the slice comprising multiple treeblocks, the slice including a first sub-slice and a second sub-slice, each of the first sub-slice and the second sub-slice comprising multiple treeblocks of the slice, the coded slice comprising a first coded sub-slice and a second coded sub-slice that correspond to the first sub-slice and the second sub-slice respectively, wherein the first and second coded sub-slices are encoded such that the first and second sub-slices can be entropy decoded independently of each other and can be reconstructed independently of each other;
    parse the first and second sub-slices in parallel using position signaling information in a slice header of the coded slice to extract the first and second coded sub-slices from the coded slices, wherein the position signaling information indicates starting byte positions or byte sizes of the first and second coded sub-slices; and
    reconstruct the first and second sub-slices in parallel.

41. The method of claim 1, wherein the coded slice comprises the slice header and coded sub-slice headers, wherein syntax elements common to the sub-slices are included in the slice header and omitted from the sub-slice headers.

42. The method of claim 10, wherein the coded slice comprises the slice header and coded sub-slice headers, wherein syntax elements common to the sub-slices are included in the slice header and omitted from the sub-slice headers.

43. The method of claim 1, wherein the coded slice comprises sub-slice headers for each of the sub-slices, the sub-slice headers comprising Context Adaptive Binary Arithmetic Coding (CABAC) initialization indicators.

44. The method of claim 10, wherein the coded slice comprises sub-slice headers for each of the sub-slices, the sub-slice headers comprising Context Adaptive Binary Arithmetic Coding (CABAC) initialization indicators.

45. The video encoding apparatus of claim 19, wherein the video encoding apparatus comprises at least one of:
- an integrated circuit;
- a microprocessor; or
- a wireless handset.

46. The video decoding apparatus of claim 28, wherein the video decoding apparatus comprises at least one of:
- an integrated circuit;
- a microprocessor; or
- a wireless handset.

47. The video encoding apparatus of claim 19, further comprising a camera configured to capture the video data.

48. The video decoding apparatus of claim 28, further comprising a display configured to display the decoded video data.

* * * * *